(12) United States Patent
Shi et al.

(10) Patent No.: US 11,153,528 B2
(45) Date of Patent: Oct. 19, 2021

(54) TECHNOLOGIES FOR STRUCTURED MEDIA PLAYBACK

(71) Applicant: Intel Corporation, Santa Clara, CA (US)

(72) Inventors: Meng Shi, Hillsboro, OR (US); Glen J. Anderson, Beaverton, OR (US); Kevin W. Bross, Tigard, OR (US); John Gaffrey, Hillsboro, OR (US); Tomer Rider, Naahryia (IL); Pearl N. Olanrewaju, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 15/283,325

(22) Filed: Oct. 1, 2016

(65) Prior Publication Data

US 2018/0098108 A1    Apr. 5, 2018

(51) Int. Cl.

| | |
|---|---|
| *H04N 5/76* | (2006.01) |
| *H04N 21/81* | (2011.01) |
| *H04N 21/4223* | (2011.01) |
| *H04N 21/422* | (2011.01) |
| *G11B 27/10* | (2006.01) |
| *G11B 27/11* | (2006.01) |

(52) U.S. Cl.
CPC ............ *H04N 5/76* (2013.01); *G11B 27/102* (2013.01); *G11B 27/11* (2013.01); *H04N 21/4223* (2013.01); *H04N 21/42222* (2013.01); *H04N 21/8146* (2013.01)

(58) Field of Classification Search
CPC ................... H04N 21/42221; H04N 9/87
See application file for complete search history.

(56) References Cited

U.S. PATENT DOCUMENTS

| 7,551,980 B2* | 6/2009 | Sakagami ............ G05D 1/0251 |
| | | 318/568.16 |
| 8,371,897 B1* | 2/2013 | Wong ....................... A63H 3/28 |
| | | 446/175 |
| 9,039,532 B2* | 5/2015 | Canessa .................. A63F 13/02 |
| | | 463/39 |
| 9,305,515 B2* | 4/2016 | Chen ................... G06Q 30/0261 |
| 9,665,179 B2* | 5/2017 | Degtyarev ............... G06F 3/017 |
| 2003/0024975 A1* | 2/2003 | Rajasekharan ... G06F 17/30879 |
| | | 235/375 |
| 2004/0171373 A1* | 9/2004 | Suda ...................... H04W 88/06 |
| | | 455/415 |
| 2005/0138077 A1* | 6/2005 | Michael ................. G06Q 30/02 |

(Continued)

*Primary Examiner* — Gelek W Topgyal
(74) *Attorney, Agent, or Firm* — Hanley, Flight & Zimmerman, LLC

(57) ABSTRACT

Technologies for structured media playback include one or more physical media objects, which may be placed on a substrate including a matrix of position sensor tags. Each of the physical media objects is configured to sense one or more position sensor tags and transmit tag information received from the sensed position sensor tags to a compute device. The compute device determines a cast of physical media objects present on the substrate based on the received tag information and selects media for playback based on the determined cast. In some embodiments, the compute device may select the index of the media at which to initiate playback based on the determined cast or collection of physical media objects.

21 Claims, 9 Drawing Sheets

(56) References Cited

U.S. PATENT DOCUMENTS

| | | | | |
|---|---|---|---|---|
| 2005/0175324 A1* | 8/2005 | Gravina | G09B 5/06 | 386/234 |
| 2006/0017950 A1* | 1/2006 | Ikegami | G06Q 10/06 | 358/1.13 |
| 2006/0273909 A1* | 12/2006 | Heiman | A63H 33/00 | 340/572.7 |
| 2007/0202811 A1* | 8/2007 | Chanowitz | H04B 5/0062 | 455/67.12 |
| 2009/0085724 A1* | 4/2009 | Naressi | G06F 21/10 | 340/10.6 |
| 2009/0124165 A1* | 5/2009 | Weston | A63H 3/00 | 446/268 |
| 2011/0027520 A1* | 2/2011 | Lauterbach | D06N 7/0089 | 428/76 |
| 2011/0043373 A1* | 2/2011 | Best | G01S 1/68 | 340/8.1 |
| 2013/0288563 A1* | 10/2013 | Zheng | A63H 3/36 | 446/268 |
| 2014/0240096 A1* | 8/2014 | Johns | G06K 19/0723 | 340/10.1 |
| 2016/0381171 A1* | 12/2016 | Anderson | H04L 67/22 | 709/217 |
| 2017/0285628 A1* | 10/2017 | Erhart | B25J 13/006 | |

* cited by examiner

TECHNOLOGIES FOR STRUCTURED MEDIA PLAYBACK

BACKGROUND

Media player devices are used to play various media, such as music, videos, movies, etc. Typically, media players are configured to play the media without little or no interaction from the user. Most media players offer only limited ability to the user to control the playback of the media. For example, user control of the media playback is often limited to fast-forward, rewind, and/or scene selection. As such, the playback of the media on typical media player devices is typically linear and not adaptable to the user interactions.

Radio Frequency Identification (RFID) and Near Field Communications (NFC) are technologies frequently used to transmit data from data tags (e.g., RFID tags or NFC tags) to a reader device, such as a compute device. In most systems, the transmission of the data from the tags to the reader is limited in communication range. Most data tags are powered via electromagnetic induction from the reader and report tag information to the reader. The specific tag information reported may vary based on the use of the data tag. For example, in inventory systems, data tags may be used to identify the product to which the data tag is applied. Of course, the data tags may be implemented in many different forms and use various technologies to communicate with the reader.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
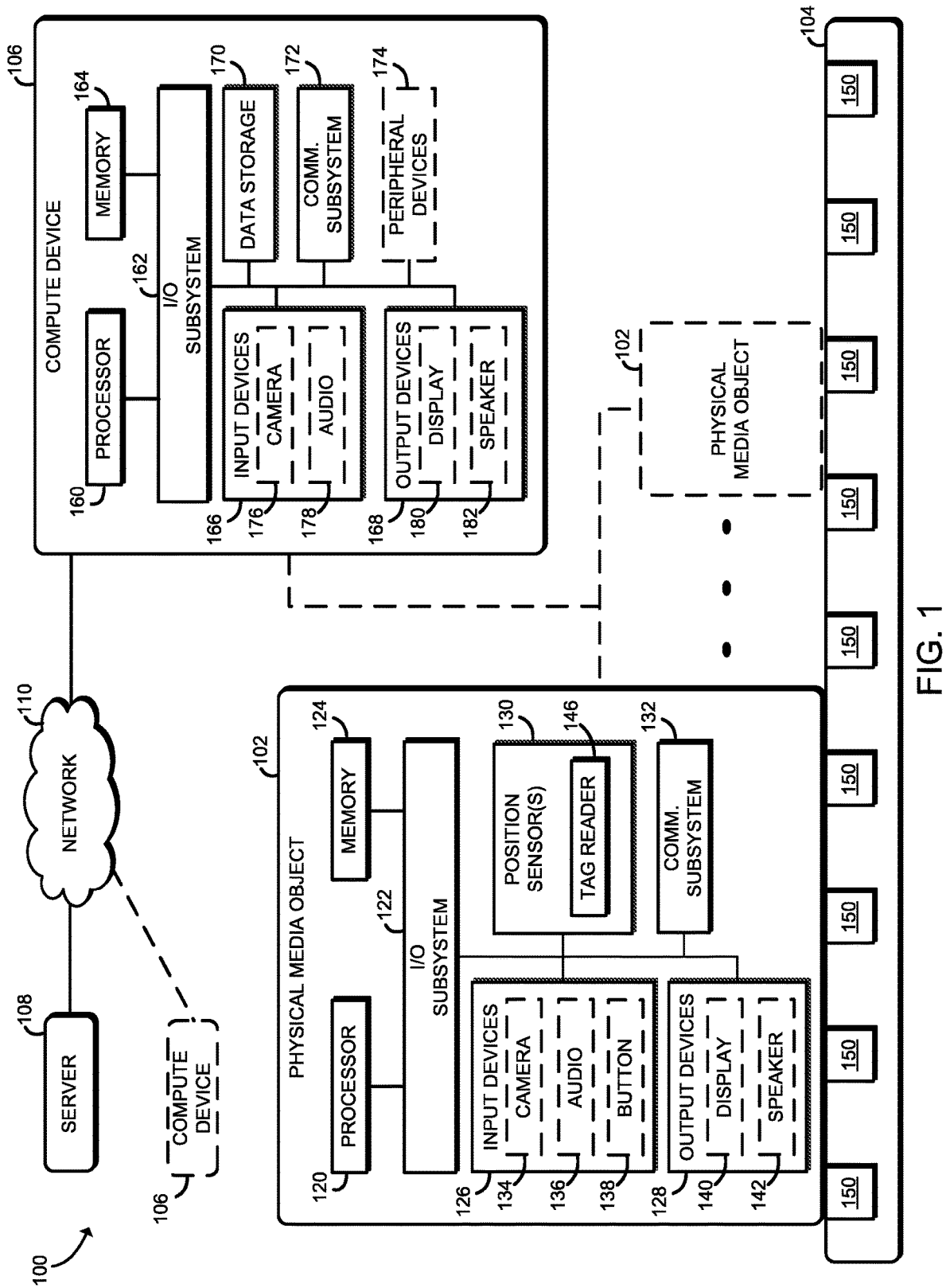
FIG. 1 is a simplified block diagram of at least one embodiment of a system for structured media playback.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for structured media playback includes one or more physical media objects 102 configured to communicate with a compute device 106 to control or modify the playback of media on the compute device 106. To do so, a user may place and/or move the physical media objects 102 on a substrate 104 to control or modify the playback of the media on the compute device 106. Each physical media object 102 is configured to continually, periodically, or responsively detect one or more position sensor tags 150 of a matrix of position sensor tags embedded in or otherwise attached to the substrate 104. Specially, each physical media object 102 receives tag information (e.g., a tag identifier) from one or more tags 150 located within the local vicinity of the physical media object 102 such that the relative position of the corresponding physical media object 102 on the substrate 104 may be determine. Each physical media object 102 transmits the received tag information to the compute device 106, which is configured to determine a physical position of each physical media object 102 based on the corresponding received tag information. The compute device 106 determines a cast of physical media objects 102 based on the relative proximity of the physical media objects 102 on the substrate 104. For example, the compute device 106 may determine which physical media objects are close to each other and define the cast of physical media objects 102 based on such determination. As discussed below, the physical media objects 102 may be embodied as any type of object capable of being placed on the substrate 104. In the illustrative embodiments, the physical media objects 102 are embodied as figurines, toys, characterless, structures, and/or other objects related to media (e.g., a movie or story). For example, each of the physical media objects 102 may be a toy figure that corresponds to an animated character in a story-based media.

As discussed in more detail below, the compute device 106 is configured to select media for playback on the compute device 106 based, at least in part, on the determined cast of physical media objects 102 (e.g., which objects 102 are placed next to each other on the substrate 104. For example, in an illustrative embodiment, the physical media objects 102 may include figurines of the three pigs and wolf from the tale of "The Three Little Pigs." As such, if those four physical media objects 102 are placed together (e.g., in proximity to each other) on the substrate 104, the compute device 106 may select and play a story or movie of "The Three Little Pigs." Additionally, depending on which particular characters are brought into close proximity to one another, the compute device 106 may select and play a specific scene from the selected media (e.g., story or movie) that corresponds to the particular arrangement of the characters (i.e., the physical media objects 102). Thus, the system 100 may provide play opportunities with the physical media objects 102 and corresponding media, such as movies, stories, videos, songs, and/or other media related to the physical media objects 102. A user (e.g., a child) may use the system 100 to interact with the physical media objects 102 to automatically initiate playback of the media based on the relative proximity of the detected physical media objects 102 to one another.

In some embodiments, the system 100 may also monitor for user interaction with the physical media objects 102 (e.g., user selection of a button on the physical media object 102) and/or with the compute device 106 (e.g., user-provided voice commands). In such embodiments, the compute device 106 may select the media for playback based on the detected user interaction. Additionally, the compute device 106 may generate output instructions to the one or more of the physical media objects 102 to cause the cause the corresponding physical media objects 102 to generate various outputs (e.g., a visual or audible output). Further, in some embodiments, the compute device 106 may communicate with another compute device 106 and/or server 108 over a network 110 to provide multi-player capability and/or monitor historical user interaction with the system 100 as discussed in more detail below.

Each physical media object 102 may be embodied as any type of character, structure, figurine, and/or other physical object related to a corresponding media that can be placed on or near the substrate 104 and capable performing the functions described herein. For example, each physical media object 102 may be embodied as, without limitation, a toy, a toy figure, a toy playset, a toy structure, a toy vehicle, a toy character, a toy construction set, a geometric shape, a token, an embedded media object, and/or other physical object. As shown in FIG. 1, an illustrative physical media object 102 includes a processor 120, an input/output ("I/O") subsystem 122, a memory 124, one or more input devices 126, one or more output devices 128, and a communication subsystem 132. Of course, the physical media object 102 may include other or additional components, such as those commonly found in a typical compute device or data tag reader, in other embodiments. Additionally, in some embodiments, one or more of the illustrative components may be incorporated in, or otherwise form a portion of, another component. For example, the memory 124, or portions thereof, may be incorporated in the processor 120 in some embodiments. Each physical media object 102 facilitates the determination of its position on the substrate 104 by the compute device 106, as discussed in more detail below.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the physical media object 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the physical media object 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the physical media object 102, on a single integrated circuit chip.

The input devices 126 may be embodied as any type of device, circuit, or component capable of receiving input from the user of the physical media object 102. For example, the input devices 126 may include a camera 134, an audio sensor or capturing device 136, a physical or visual input button(s) 138, motion sensors (e.g., accelerometers and/or gyroscopes) (not shown), touch sensors (e.g., capacitive or resistive touch sensors, force sensors, or other touch sensors) (not shown), and/or other input devices.

In some embodiments, the camera 134 and the audio sensor 136 may be used to detect interaction from the user. For example, the camera 134 may be used to monitor a gesture performed by the user or a facial expression of the user, and the audio sensor 136 may be used capture the user's voice. The camera 134 may be embodied as a digital camera or other digital imaging device integrated with the physical media object 102 or otherwise communicatively coupled thereto. The camera 134 may include an electronic image sensor, such as an active-pixel sensor (APS), e.g., a complementary metal-oxide-semiconductor (CMOS) sensor, or a charge-coupled device (CCD). The camera 134 may be used to capture image data including, in some embodiments, capturing still images or video images. Similarly, the audio sensor 136 may be embodied as any type of sensor capable of capturing audio signals such as one or more microphones, a line input jack and associated circuitry, an analog-to-digital converter (ADC), or other type of audio sensor.

The output devices 128 may be embodied as any type of device, circuit, or component capable of generating an output on the physical media object 102. For example, the output devices 128 may include a display 140, a speaker 142 or other audio output device, one or more visible lights and/or IR LEDS (not shown), and/or other output devices. In some embodiments, the output devices 128 may be embodied as, or otherwise, include a display 140 to provide information to the user of the physical media object 102. The display 140 may be embodied as any type of display capable of displaying digital information such as a liquid crystal display (LCD), a light emitting diode (LED), a plasma display, a cathode ray tube (CRT), or other type of display device. In some embodiments, the display 140 may include a touch screen to allow user interaction with the physical media object 102. The physical media object 102 may also include any number of additional input/output devices, interface devices, and/or other peripheral devices. For example, in some embodiments, the peripheral devices may include a touch screen, graphics circuitry, keyboard, mouse, speaker system, network interface, and/or other input/output devices, interface devices, and/or peripheral devices.

The position sensor(s) 130 may include, or otherwise be embodied as, any type of sensor, sensor circuit, reader, or other circuit or component capable of sensing, detecting, measuring, or otherwise producing data indicative of one or more position sensor tags 150 of the substrate 104 when the media object 102 is placed on or near the substrate 104. It should be appreciated that the position sensor(s) 130 may continuously or periodically sense for the tags 150 of the substrate 104 within a local vicinity of the physical media object 102. In the illustrative embodiment, the position sensor(s) 130 includes one or more tag readers 146 configured to detect or sense the position sensor tags 150 of the substrate 104. Of course, the specific types and number of position sensors 130 may depend on the type and number of the position sensor tags 150 embedded in the substrate 104. For example, each tag reader 146 of the position sensors 130 (may be embodied as or otherwise include one or more radio frequency identifier (RFID) and/or near-field communication (NFC) readers that are capable of interrogating and identifying RFID and/or NFC tags 150 embedded in the substrate 104.

In other embodiments, the position sensors 130 may be embodied as, or otherwise include, proximity sensors, Reed switches, or any other sensor or device capable of detecting or generating data indicative of the position and/or proximity of the physical media objects 102 on the substrate 104. For example, in some embodiments, the position sensors 130 may be capable of detecting signals emitted by the substrate 104, such sensors capable of detecting infrared (IR) light emitted by one or more IR LEDs of the substrate 104, microphones capable of detecting sound emitted by the substrate 104, or other sensors. In some embodiments, other components of the physical media object 102, such as the communication subsystem 144 and/or the camera 134 may be used to determine, or otherwise support the determination of, the position and/or proximity of the physical media object 102 on the substrate. In some embodiments, radio strength and/or direction capabilities, such as those available in Bluetooth® Low Energy, may be used to determine the relative position of the physical media object 102 on the substrate 104. Additionally, in some embodiments, proximity sensing may occur between physical media objects 102 (e.g., each physical media object 102 may include a proximity sensing sensor).

The communication subsystem 132 may be embodied as any type of communication circuit, device, or collection thereof, capable of enabling communications between the physical media object 102 and other devices (e.g., other physical media objects 102, the compute device 106, the server 108 discussed below). To do so, the communication subsystem 132 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The substrate 104 may be embodied as any type of substrate on which the physical media objects 102 may be placed. The substrate 104 may be formed of a rigid or flexible material and includes a matrix of position sensor tags 150 as discussed above. Each position sensor tag 150 may be embodied as any data tag, circuitry, device, physical feature, or other aspect of the substrate 104 capable of being detected, sensed, or otherwise read by the tag reader(s) 146 of the physical media object 102 and from which the relative location of the physical media object 102 on the substrate 104 may be determined. For example, in the illustrative embodiment, each position sensor tags 150 is embodied as an RFID or NFC data tag embedded in or otherwise attached to the substrate 104. As discussed in more detail below, the position sensor tags 150 may transmit tag information, such as a tag identifier that uniquely identifies the corresponding position sensor tag 150, to one or more physical media objects 102 in response to being sensed or interrogated.

The compute device 106 may be embodied as any type of computation or compute device capable of playing media and performing the functions described herein, including, without limitation, a tablet computer, a smartphone, a laptop computer, a notebook, desktop computer, a netbook, an Ultrabook™, a smart device, a personal digital assistant, a mobile Internet device, and/or other compute device. As shown in FIG. 1, the illustrative compute device 106 includes a processor 160, an input/output ("I/O") subsystem 162, a memory 164, one or more input devices 166, one or more output devices 168, a data storage 170, and a communication subsystem 172. Of course, the compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 164, or portions thereof, may be incorporated in the processor 160 in some embodiments.

As discussed above, the compute device 106 is configured to receive the position sensor tag information from the physical media objects 102 and determine the physical position of each of the physical media object 102 based on the received position sensor tag information. In some embodiments, as mentioned above, the position sensor tag information may include a tag identifier of the sensed position sensor tag 150. Each tag identifier is configured to uniquely identify the corresponding sensed position sensor tag 150 from other position sensor tags 150 in a vicinity of the sensed position sensor tag 150. In other embodiments, the position sensor tag information may include metadata related to the sensed position sensor tag 150. In such embodiments, the metadata defines context information related to the sensed position sensor tag 150 (e.g., timing information related to when the tag 150 was sensed, product information, substrate identifiers, etc.).

As discussed above, the compute device 106 is further configured to determine a cast of physical media objects 102 based on the proximity and/or a movement of the physical media objects 102. The compute device 106 subsequently selects a media for playback based on the determined cast of physical media objects 102. It should be appreciated that the physical media objects 102 and the corresponding positions may be continuously or periodically updated.

The processor 160 may be embodied as any type of processor capable of performing the functions described herein. For example, the processor 160 may be embodied as a single or multi-core processor(s), digital signal processor, microcontroller, or other processor or processing/controlling circuit. Similarly, the memory 164 may be embodied as any type of volatile or non-volatile memory or data storage capable of performing the functions described herein. In operation, the memory 164 may store various data and software used during operation of the compute device 106 such as operating systems, applications, programs, libraries, and drivers. The memory 164 is communicatively coupled to the processor 160 via the I/O subsystem 162, which may be embodied as circuitry and/or components to facilitate input/output operations with the processor 160, the memory 164, and other components of the compute device 106. For example, the I/O subsystem 162 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 162 may form a portion of a system-on-a-chip (SoC) and be incorporated, along with the processor 160, the memory 164, and other components of the compute device 106, on a single integrated circuit chip.

The input devices 166 may be embodied as any type of device, circuit, or component capable of receiving input from the user of the compute device 106. For example, the input devices 166 may include a camera 176, an audio sensor 178, motion sensors (e.g., accelerometers and/or gyroscopes) (not shown), touch sensors (e.g., capacitive or resistive touch sensors, force sensors, or other touch sensors) (not shown), or other input devices. Those individual components of the input devices 166 may be similar to the corresponding components of the input devices 126 of the physical media object 102, the description of which is applicable to the corresponding components of the input devices 166 and is not repeated herein so as not to obscure the present disclosure.

The output devices 168 may be embodied as any type of device, circuit, or component capable of generating an output on the compute device 106. For example, the output devices 168 may include a display 180, a speaker 182, one or more visible light and/or IR LEDS (not shown), and/or other output devices. Those individual components of the output devices 168 may be similar to the corresponding components of the output devices 128 of the physical media object 102, the description of which is applicable to the corresponding components of the output devices 168 and is not repeated herein so as not to obscure the present disclosure.

The data storage 170 may be embodied as any type of device or devices configured for short-term or long-term storage of data such as, for example, memory devices and circuits, memory cards, hard disk drives, solid-state drives, or other data storage devices. In the illustrative embodiment, the compute device 106 may be configured to store media content, media mapping, historical user data, and other data in the data storage 170. As discussed in more detail below, the historical user data includes, but is not limited to, previously selected media, media index, media objects, and user interactions.

The communication subsystem 172 may be embodied as any type of communication circuit, device, or collection thereof, capable of enabling communications between the compute device 106 and other devices (e.g., other compute devices 106, the physical media object 102, the server 108 discussed below). To do so, the communication subsystem 172 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the compute device 106 may also include one or more peripheral devices 174. The peripheral devices 174 may include any number of additional peripheral or interface devices, such as other input/output devices, storage devices, and so forth. The particular devices included in the peripheral devices 174 may depend on, for example, the type and/or configuration of the compute device 106 and/or the physical media object 102.

The server 108 may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As such, the server 108 may include components commonly found in a server compute device such as processors, memory, I/O subsystems, communication circuits, and/or other devices. The description of such components of the server 108 is similar to the corresponding components of the compute device 106 and it not repeated herein for clarity of the description. It should be appreciated that the server 108 may be embodied as a single compute device or a collection of distributed compute devices.

The network 110 may be embodied as any type of network capable of facilitating communications between the compute device 106 and the server 108. For example, the network 110 may be embodied as, or otherwise include, a wireless local area network (LAN), a wireless wide area network (WAN), a cellular network, and/or a publicly-accessible, global network such as the Internet. As such, the network 110 may include any number of additional devices, such as additional computers, routers, and switches, to facilitate communications thereacross.

Figure 2:
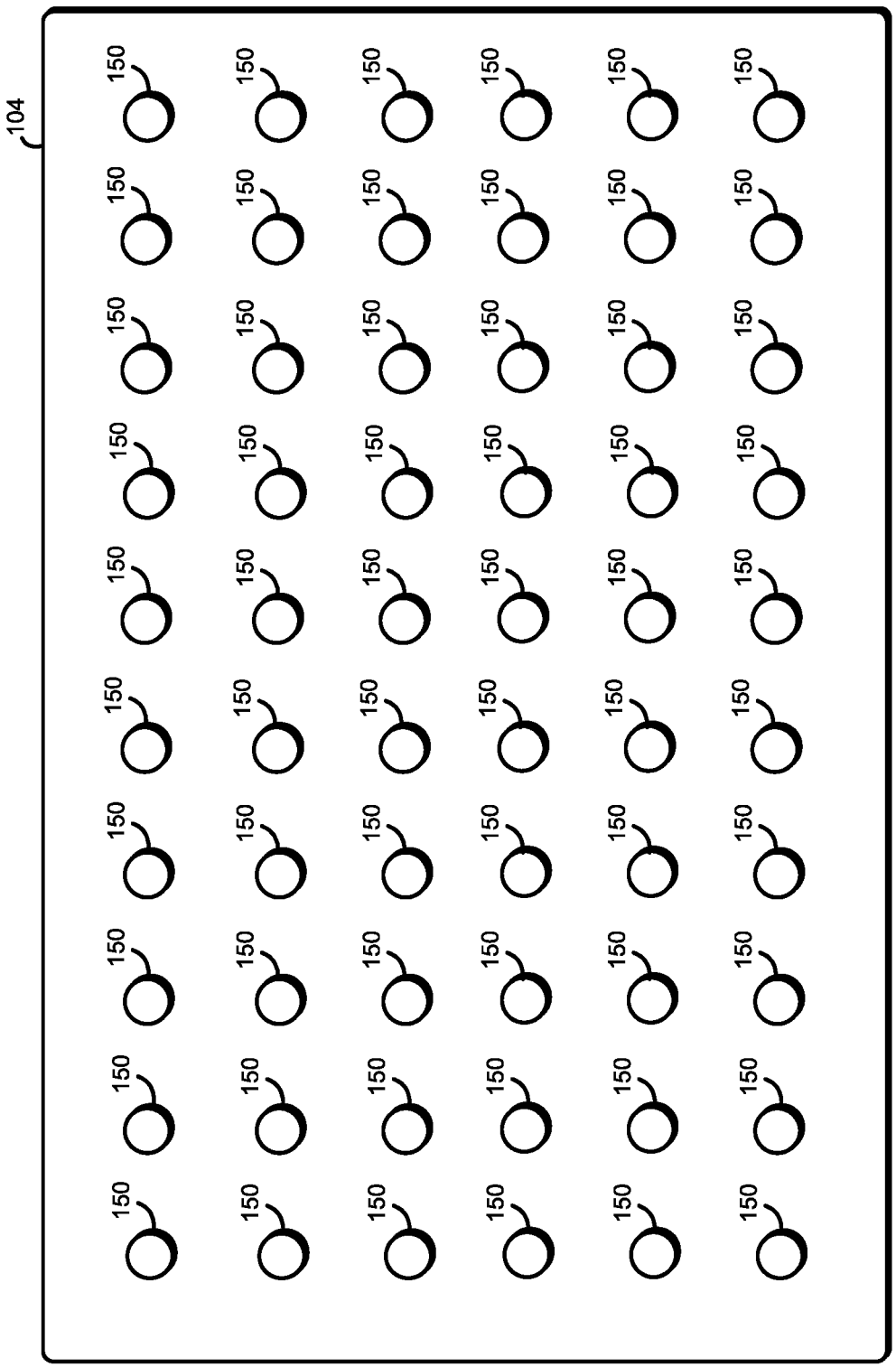
FIG. 2 is a plan view a simplified diagram of at least one embodiment of a substrate having a matrix of position sensor tags embedded therein on which a physical media object of the system of FIG. 1 may be placed.

Referring now to FIG. 2, an illustrative substrate 104 includes a matrix of position sensor tags 150. In the illustrative embodiment, as discussed above, the position sensor tags 150 are embodied as RFID or NFC tags, but may be embodied as other types of data tags, circuits, device, or structures capable of being sensed by the physical media objects 102. As shown in FIG. 2, the position sensor tags 150 are arranged in a grid pattern and spaced evenly apart. The position sensor tags 150 are illustratively embedded in the substrate 104, but may be attached or coupled to the substrate 104 in other embodiments. Of course, the number and arrangement of the position sensor tags 150 in or on the substrate 104 may vary and may depend on the type of position sensors 130 of the physical media object 102. As discussed above, each physical media object 102 is configured to sense at least one position sensor tag 150 of the matrix of position sensor tags 150 (e.g., receive tag information therefrom) when the physical media object 102 is positioned on the substrate 104. It should be appreciated that in some embodiments, the physical media object 102 may not need to be directly positioned on the substrate 104; instead, the physical media object 102 may sense the position sensor tag 150 in a close proximity (e.g., the physical media object 102 may be placed above the substrate 104 and still sense one or more position sensor tags 150).

Figure 3:
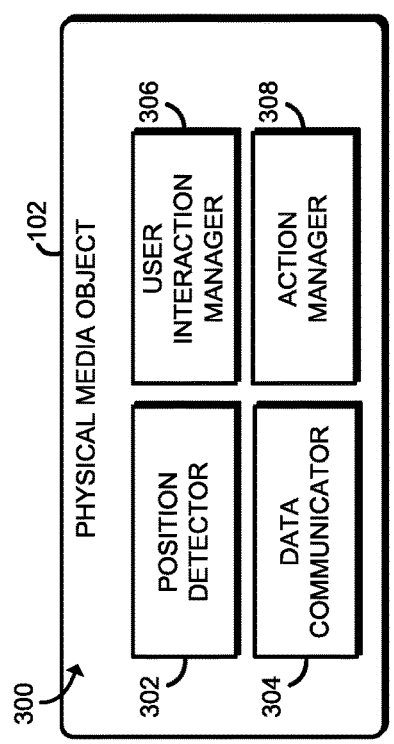
FIG. 3 is a simplified block diagram of at least one embodiment of an environment that may be established by a physical media object of the system of FIG. 1.

Referring now to FIG. 3, in use, each physical media object 102 establishes an environment 300. The illustrative environment 300 includes a position detector 302, a data communicator 304, a user interaction manager 306, and an action manager 308. The various components of the environment 300 may be embodied as hardware, firmware, software, or a combination thereof. As such, in some embodiments, one or more of the components of the environment 300 may be embodied as circuitry or collection of electrical devices (e.g., a position detector circuit 302, a data communicator circuit 304, a user interaction manager circuit 306, an action manager circuit 308, etc.). It should be appreciated that, in such embodiments, one or more of the position detector circuit 302, the data communicator circuit 304, the user interaction manager circuit 306, and/or the action manager circuit 308 may form a portion of one or more of the processor 120, the I/O subsystem 122, the communication subsystem 132, and/or other components of the physical media object 102. Additionally, in some embodiments, one or more of the illustrative components of the environment 300 may form a portion of another component and/or one or more of the illustrative components may be independent of one another. Further, in some embodiments, one or more of the components of the environment 300 may be embodied as virtualized hardware components or emulated architecture, which may be established and maintained by the processor 120 or other components of the physical media object 102.

The position detector 302 is configured to sense one or more position sensor tags 150 of the substrate 104. It should be appreciated that the position detector 302 may continuously or periodically interrogate, detect, or otherwise sense the position sensor tags 150 within a local vicinity of the physical media object 102. In the illustrative embodiment, the position detector 302 receives tag information from each detected or sensed position sensor tag 150, which may be used to determine the position of the media object 102 on the substrate 104. For example, the physical media object 102 may transmit the sensed tag information to the compute device 106, which determines the position of the physical media object 102 relative to the substrate 104 based on the sensed position sensor tag information. Additionally or alternatively, the physical media object 102 may locally determine its position relative to the substrate 104 based on the sensed position sensor tag information. In some embodiments, the position detector 302 may be further configured to determine a physical orientation of the physical media object 102 based on received tag information (e.g., based on tag information received from two or more position sensor tags 150).

The data communicator 304 is configured to facilitate communication between the physical media object 102 and the compute device 106. As discussed above, in the illustrative embodiment, the data communicator 304 transmits the sensed position sensor tag information to the compute device 106 in order to facilitate the determination of the location of the physical media object 102 on the substrate 104 and/or its proximity to other physical media objects 102. It should be appreciated that the sensed position sensor tag information may be continuously or periodically transmitted to the compute device 106. Alternatively, in some embodiments, the data communicator 304 may only transmit the position sensor tag information related to a newly sensed position sensor tag 150. Additionally, in some embodiments, the data communicator 304 is further configured to receive the media object output instructions from the compute device 106. The media object output instruction is processed by the action manager 308 to generate an action output as discussed in more detail below.

The user interaction manager 306 is configured to monitor and detect a user interaction with the physical media object 102. In some embodiments, the user interaction manager 306 may detect a direct user interaction based on a physical interaction of the user with the physical media object 102. For example, the user may physically interact with the physical input switch or button 138 on the physical media object 102. Additionally or alternatively, in some embodiments, the action manager 308 may detect an indirect user interaction based on a gesture performed by the user, a facial expression of the user, and/or captured voice data of the user detected by the physical media object 102 using the input devices 126 of the physical media object 102.

The action manager 308 is configured to generate an output action. For example, the output action may include, but not limited to, audible, visual, and/or tactile output actions. For example, the action manager 308 may illuminate a light of the physical media object 102, play a sound from the physical media object 102, control movement of a part of the physical media object 102 to perform a gesture, and/or the like. In some embodiments, the action manager 308 may generate the output action based on a detected user interaction with the physical media object 102. In other embodiments, the action manager 308 may generate the output action based on the tag information received from one or more position sensor tags 150. Additionally, in other embodiments, the action manager 308 may receive a media object output instruction from the compute device 106 and generate a corresponding output action.

Figure 4:
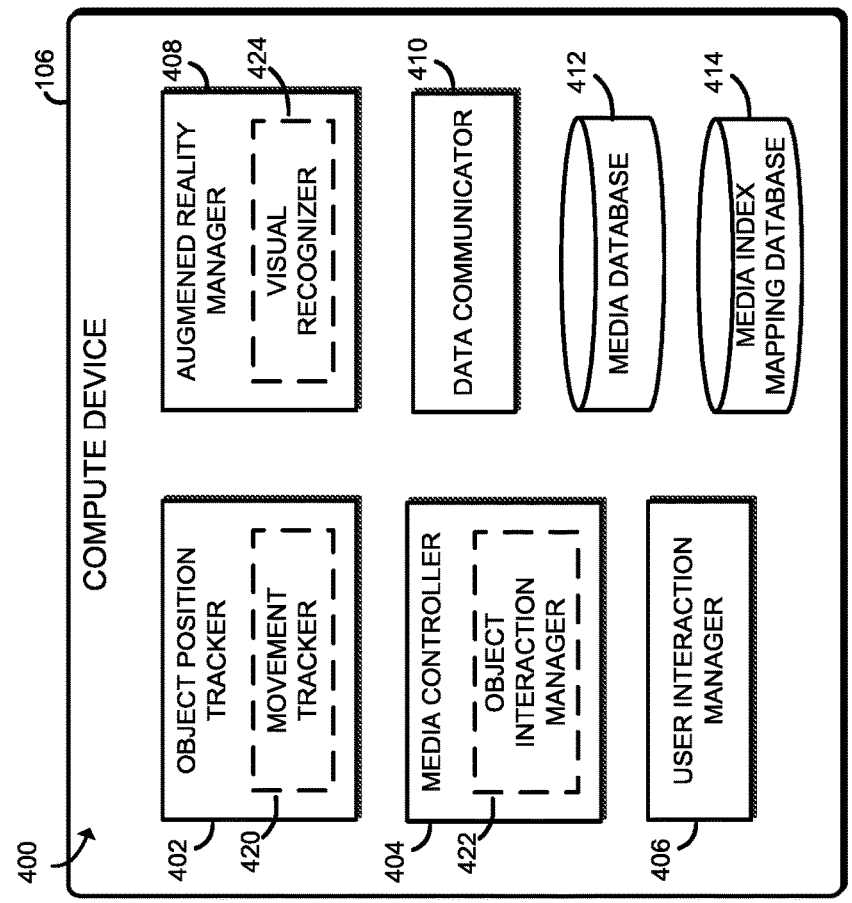
FIG. 4 is a simplified block diagram of at least one embodiment of an environment that may be established by a compute device of the system of FIG. 1.

Referring now to FIG. 4, in use, the compute device 106 establishes an environment 400. The illustrative environment 400 includes an object position tracker 402, a media controller 404, a user interaction manager 406, an augmented reality manager 408, and a data communicator 410. The various components of the environment 400 may be embodied as hardware, firmware, software, or a combination thereof. As such, in some embodiments, one or more of the components of the environment 400 may be embodied as circuitry or collection of electrical devices (e.g., an object position tracker circuit 402, a media controller circuit 404, a user interaction manager circuit 406, an augmented reality manager circuit 408, a data communicator circuit 410, etc.). It should be appreciated that, in such embodiments, one or more of the object position tracker circuit 402, the media controller circuit 404, the user interaction manager circuit 406, the augmented reality manager circuit 408, and/or the data communicator circuit 410 may form a portion of one or more of the processor 160, the I/O subsystem 162, the communication subsystem 172, and/or other components of the compute device 106. Additionally, in some embodiments, one or more of the illustrative components of the environment 400 may form a portion of another component and/or one or more of the illustrative components may be independent of one another. Further, in some embodiments, one or more of the components of the environment 400 may be embodied as virtualized hardware components or emulated architecture, which may be established and maintained by the processor 160 or other components of the compute device 106.

The object position tracker 402 is configured to determine the physical position of each of the physical media object 102 relative to the substrate 104 based on the position sensor tag information received from the corresponding physical media object 102. In the illustrative embodiment, the object position tracker 402 is further configured to determine a relative proximity of the physical media objects 102 to one another based on the determined position of the physical media objects 102. The relative proximity between the physical media objects 102 is used to determine a cast of the physical media objects 102 from which the media may be selected for playback as discussed in more detail below. Additionally, in some embodiments, the object position tracker 402 may also determine a movement of one or more physical media objects 102. To do so, the object position tracker 402 may include a movement tracker 420. The movement tracker 420 is configured to track the movement of the corresponding physical media object 102 based on the determined position of the physical media objects 102 over periods of time.

The media controller 404 is configured to determine a cast of the physical media objects 102 and select media for playback based on the determined cast. As discussed above, the cast of the physical media objects 102 is determined based on the physical media objects 102 from which the position sensor tag information was received. The cast of the physical media objects 102 indicates which physical media objects 102 are within a local vicinity of each other in a given setting. Based on the determined cast of the physical media objects 102, the media controller 404 selects the media that corresponds to the cast of the physical media objects 102 for playback. In some embodiments, the media controller 404 may ignore those physical media object 102 that are not in the proximity with other physical media objects 102. The media content available for playback on the compute device 106 is stored in a media database 412. The media content stored in the media database 412 may be embodied as any type of media capable of being played by the compute device 106 including, but not limited to, audio media, video media, a movie, a story, an audio book, and/or other types of media.

Additionally, the media controller 404 may determine a media index at which to initiate playback of the selected media based on the determined cast of physical media objects 102. The media index defines a present temporal location within the selected media. For example, if the media controller 404 determines that three physical media objects 102, embodied as one pig, a wolf, and a house made of straw, are in closer proximity compared to two other pig physical media objects 102, the media controller 404 may select a media index that corresponds to a scene in which the wolf destroys the straw house. The media index may be determined based on a media index mapping stored in a media index mapping database 414 that maps cast of physical media objects 102 to indexes of particular media content. Of course, other mechanisms for identifying a media index based on the cast of physical media objects 102 may be used in other embodiments.

Additionally or alternatively, in some embodiments, the media controller 404 may include an object interaction manager 422. The object interaction manager 422 is configured manage and respond to user interactions with the physical media objects 102. To do so, the object interaction manager 422 may select new media or a new media index at which to play selected media based on the user's interaction with a physical media object 102. For example, if the user presses a particular button on a "big bad wolf" physical media object 102, the object interaction manager 422 may change the media index of the selected media to a temporal point in the movie or story at which the "big bad wolf" character blows down a house. Additionally, in some embodiments, the object interaction manager 422 may determine an interaction between the physical media objects 102 by determining the relative proximity between each of the physical media objects 102 in the given setting.

The user interaction manager 406 is configured to monitor a user interaction with the compute device 106. In some embodiments, the user interaction manager 406 may detect a direct user interaction based on a physical interaction of the user with the compute device 106. For example, the user may physically interact with a touch screen (not shown) on the physical media object 102. Additionally or alternatively, in some embodiments, the user interaction manager 406 may detect an indirect user interaction based on a gesture performed by the user, a facial expression of the user, and/or captured voice of the user.

The augmented reality manager 408 is configured to generate augmented reality objects. In some embodiments, the augmented reality manager 408 may generate augmented reality objects based on the cast of the physical media objects 102 and/or movement of the physical media objects 102. Additionally or alternatively, the augmented reality manager 408 may generate augmented reality objects based on the presently played media and/or the present media index of played media. Additionally or alternatively, the augmented reality manager 408 may generate augmented reality objects based on the user interaction with the physical media object 102 and/or the compute device 106.

The data communicator 410 is configured to facilitate communication between the compute device 106 and the physical media object 102, the compute device 106 and the server 108, and/or the compute device 106 and another compute device 106. As discussed above, in the illustrative embodiment, the data communicator 410 receives the sensed position sensor tag information from the physical media object 102 in order to determine the proximity of the physical media objects 102. The data communicator 410 is further configured to transmit any media object output instruction to the physical media object 102, which may be generated based on the sensed position sensor tag information and/or the user interaction with the compute device 106.

Figure 5:
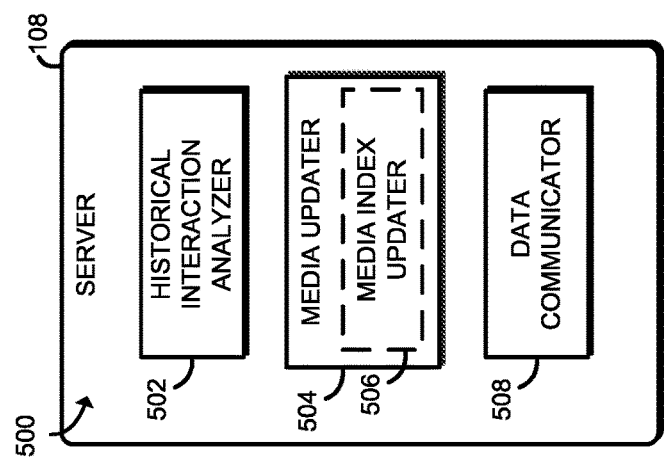
FIG. 5 is a simplified block diagram of at least one embodiment of an environment that may be established by a server of the system of FIG. 1.

Referring now to FIG. 5, in use, the server 108 establishes an environment 500. The illustrative environment 500 includes a historical interaction analyzer 502, a media updater 504, and a data communicator 508. The various components of the environment 500 may be embodied as hardware, firmware, software, or a combination thereof. As such, in some embodiments, one or more of the components of the environment 500 may be embodied as circuitry or collection of electrical devices (e.g., a historical interaction analyzer circuit 502, a media updater circuit 504, a data communicator circuit 508, etc.). It should be appreciated that, in such embodiments, one or more of the historical interaction analyzer circuit 502, the media updater circuit 504, and/or the data communicator circuit 508 may form a portion of one or more of the processor (not shown), the I/O subsystem (not shown), the communication subsystem (not shown), and/or other components of the compute device (not shown). Additionally, in some embodiments, one or more of the illustrative components of the environment 500 may form a portion of another component and/or one or more of the illustrative components may be independent of one another. Further, in some embodiments, one or more of the components of the environment 500 may be embodied as virtualized hardware components or emulated architecture, which may be established and maintained by the processor or other components of the server 108.

The historical interaction analyzer 502 is configured to analyze the user's historical interaction with and use of the physical media objects 102 and/or compute device 106. For example, the historical interaction analyzer 502 may track the previously selected media, previously determined media indexes, media objects used by the user, and other user interactions with the physical media objects 102 and/or compute device 106. The historical interaction analyzer 502 may generate and store historical data based on such analyses and update the media content, media index mapping, and/or other aspects of the compute device 106 and/or physical media objects 102.

The media updater 504 is configured to update the media content and/or media index mapping of the compute device 106 based on the historical user interaction data produced by the historical interaction analyzer. In embodiments in which a multiplayer mode is enabled, the media updater 504 may also update other compute devices 106 based on the user interaction data. For example, in such embodiments, the media updater 504 may transmit multiplayer information to other compute devices 106 that are presently playing the same media index of the same media (e.g., playing the same game). The data communicator 508 is configured to facilitate communication between the server 108 and the compute devices 106 of the system 100.

Figure 6:
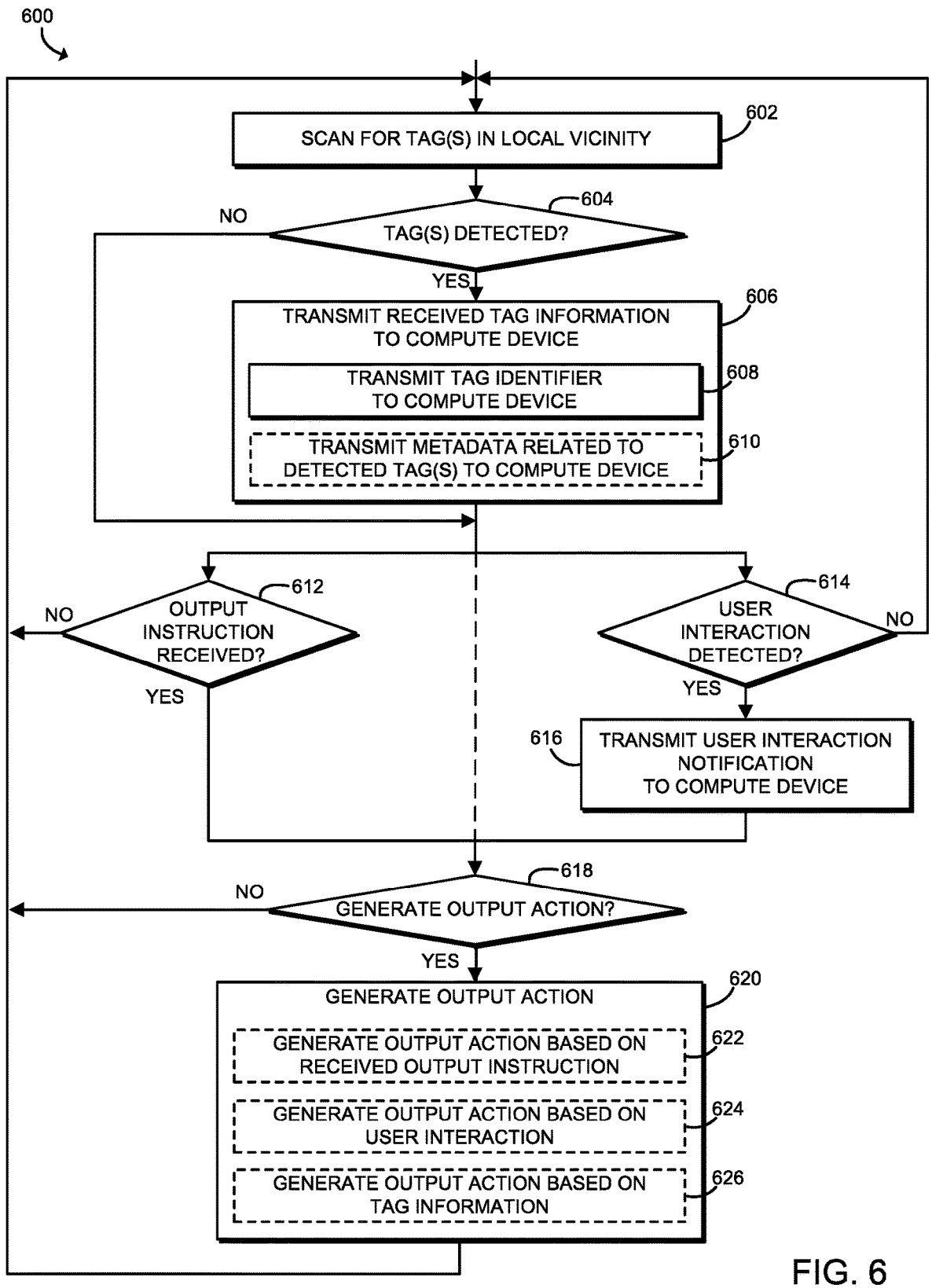
FIG. 6 is a simplified flow diagram of at least one embodiment of a method for facilitating structured media playback that may be executed by the physical media object of FIGS. 1 and 3.

Referring now to FIG. 6, in use, each physical media object 102 may execute a method 600 for facilitating structured media playback. The method 600 begins with block 602 in which the physical media object 102 scans for position sensor tags 150 of the substrate 104 in local vicinity of the physical media object 102. To do so, in the illustrative embodiment, the physical media object 102 transmits an interrogation signal to cause the one or more position sensor tags 150 to transmit position sensor tag information (e.g., a tag identifier) to the physical media object 102. In block 604, the physical media object 102 determines whether any position sensor tag(s) 150 has been detected (e.g., based on receipt of the tag information). If not, the method 600 branches ahead to blocks 612, 614, and 618, described below. It should be appreciated that in some embodiments, the physical media object 102 may continually, continuously, periodically, or responsively scan for the position sensor tags 150. In other embodiments, the physical media object 102 may only scan for new position sensor tags 150.

If, however, the physical media object 102 detects one or more position sensor tags 150, the method 600 advances to block 606 in which the physical media object 102 transmits the received position sensor tag information to the compute device 106. As discussed above, the physical sensor tag information may be embodied as, or otherwise include, a tag identifier that uniquely identifies the sensed physical sensor tag 150 from other position sensor tags in the local vicinity of the sensed position sensor tag 150. Additionally or alternatively, the position sensor tag information may be embodied as, or otherwise include, metadata that defines a context of the corresponding physical sensor tag 150. As such, in block 608, the physical media object 102 may transmit the tag identifier to the compute device 106. Additionally, in embodiments in which the position sensor tag information includes the metadata, the physical media object 102 may transmit the metadata to the compute device 106 in block 610.

After the physical media object 102 has transmitted the received position sensor tag information to the compute device 106, the method 600 advances to blocks 612, 614, which may be executed contemporaneously with each other. In block 612, the physical media object 102 determines whether a media object output instruction has been received from the compute device 106. If not, the method 600 loops back to block 602 in which the physical media object 102 continues to scan for a position sensor tag 150 in local vicinity. If, however, the physical media object 102 determines that the media object output instruction is received, the method 600 advances to block 618 discussed below.

In block 614, the physical media object 102 contemporaneously determines whether a user interaction with the physical media object 102 has been detected. As discussed above, the user interaction may be embodied as a physical interaction (e.g., the user has pressed a button of the physical media object 102) or an indirect interaction (e.g., a gesture made by the user). If no user interaction has been detected, the method 600 loops back to block 602 in which the physical media object 102 continues to scan for a position sensor tag 150 in local vicinity. If, however, the physical media object 102 determines that a user interaction has been detected, the method 600 advances to block 616 in which the physical media object 102 transmits a user interaction notification to the compute device 106. The user interaction notification indicates the particular detected user interaction with the physical media object 102. After the physical media object 102 has transmitted the user interaction notification, the method 600 advances to block 618 discussed below.

Referring back to block 606, after transmitting the received position sensor tag information to the compute device 106 in block 606, the method 600 may directly branch ahead to the block 618 in addition to blocks 612, 614. In block 618, the physical media object 102 determines whether to generate an output action. The output action may be based on any suitable data including, but not limited to, an output instruction received from the compute device 106 in block 612, a user interaction detected in block 614, and/or on the physical sensor tag information received in block 604. If no output action is to be generated, the method 600 loops back to block 602 in which the physical media object 102 continues to scan for a position sensor tag in local vicinity. If, however, the physical media object 102 determines to generate the output action, the method 600 advances to block 620 in which the physical media object 102 generates the output action. For example, in embodiments in which the media object output instruction has been received in block 622, the physical media object 102 generates the output action based the received media object output instruction. Additionally or alternatively, in embodiments in which the user interaction has been detected in block 624, the physical media object 102 generates the output action based on the detected user interaction. Additionally or alternatively, in other embodiments in which the position sensor tag information has been received, the physical media object 102 generates the output action based the received position sensor tag information.

Figure 7:
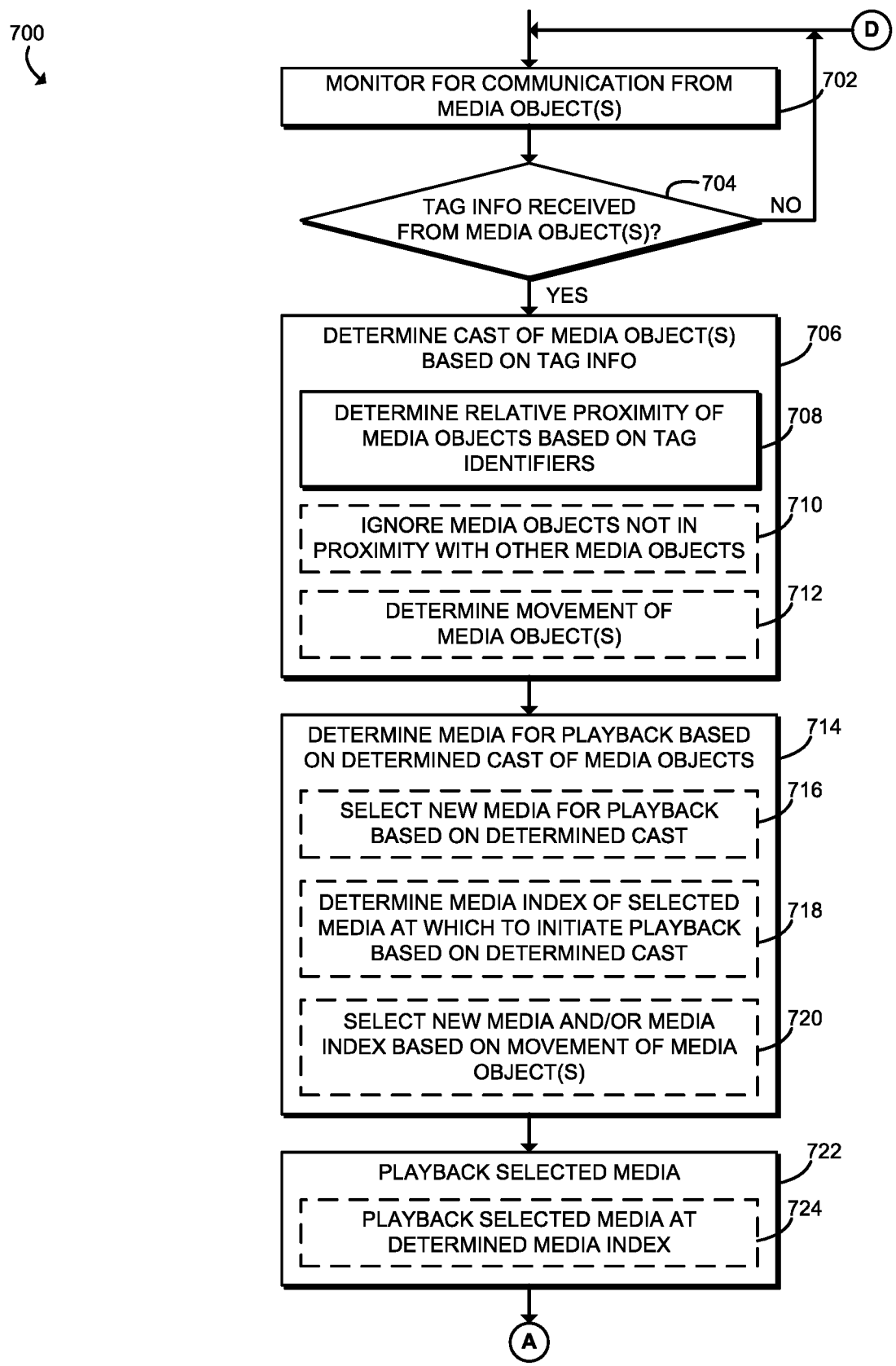
FIGS. 7-9 is a simplified flow diagram of at least one embodiment of a method for structured media playback that may be executed by the compute device of FIGS. 1 and 4.
Figure 8:
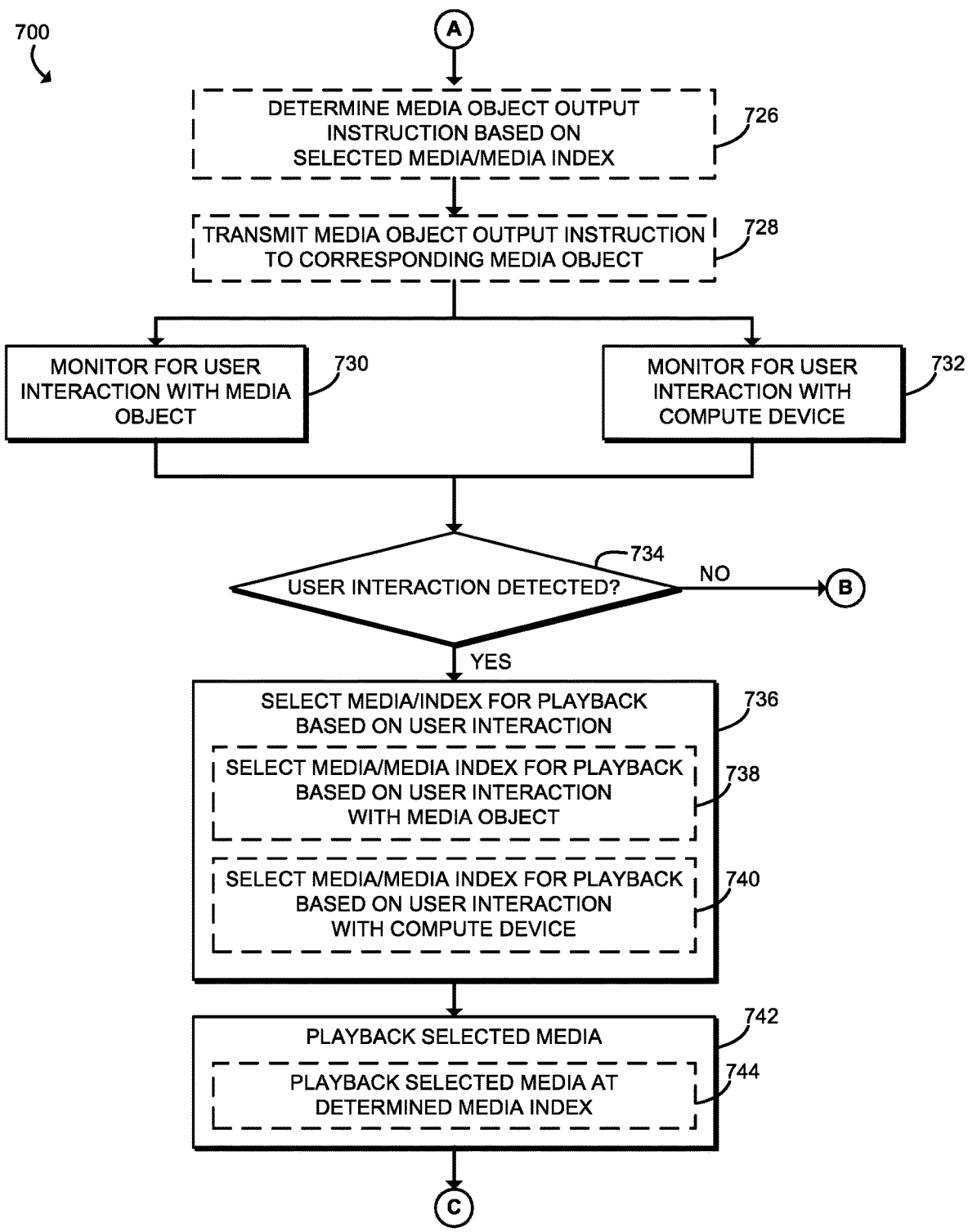
Figure 9:
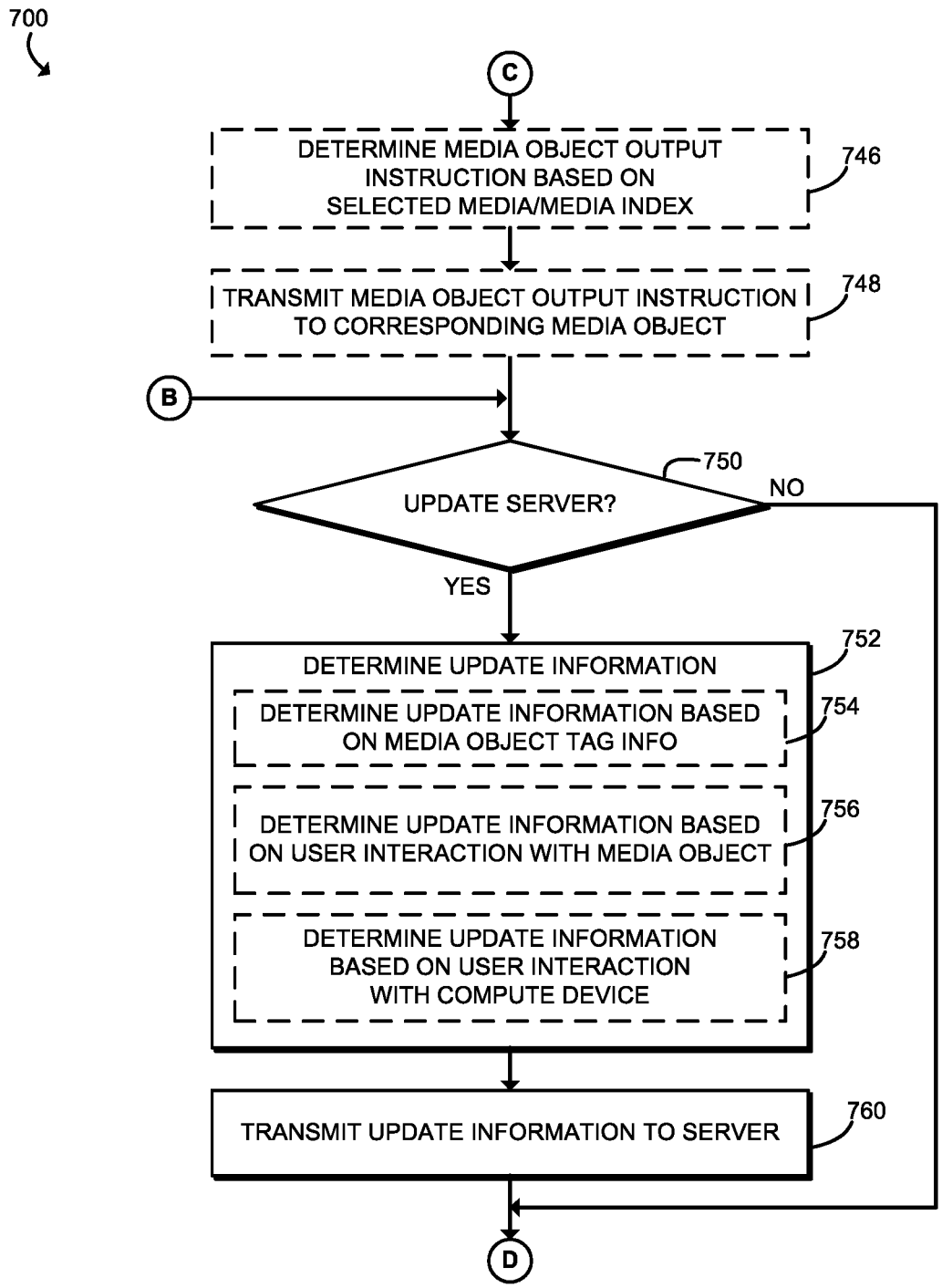

Referring now to FIGS. 7-9, in use, the compute device 106 may execute a method 700 for structured media playback. The method 700 begins with block 702 in which the compute device 106 monitors for the communication from the physical media object(s) 102. In block 704, the compute device 106 determines whether any position sensor tag information has been received from one or more physical media objects 102. If not, the method 700 loops back to block 702 in which the compute device 106 continues to monitor for communication from the physical media objects 102. If, however, the compute device 106 has successfully received position sensor tag information, the method 700 advances to block 706. In block 706, the compute device 106 determines a cast of the physical media objects 102 based on the received position sensor tag information. To do so, the compute device 106 determines, in block 708, the relative proximity of each physical media object 102 to one another based on the tag identifiers transmitted by each physical media object 102. As discussed above, the physical sensor tag information may include a tag identifier that uniquely identifies the corresponding position sensor tag 150 from other positions sensor tags 150 of the substrate 104. As such, the compute device 106 may determine the present location of each physical media object 102 based on the tag identifier sensed and transmitted by each physical media object 102 and determine which physical media objects 102 are in proximity to each other based on the determined location of each physical media object 102. In some embodiments, in block 710, the compute device 106 may ignore those physical media object 102 that are determined not to be in proximity with other physical media objects 102 (e.g., a physical media object 102 that has been set aside on an outer edge of the substrate 104). Additionally, in some embodiments in block 712, the compute device 106 may determine or monitor a movement of one or more of the physical media objects 102 across the substrate 104. To do so, the compute device 106 may monitor the stream of tag identifiers transmitted by the moved physical media object 102 as it is moved across the substrate 104 and determine various aspects of such movement (e.g., direction, speed, etc.). The determined movement of one or more physical media objects 102 may supplement the determination of the cast of physical media objects 102 for selecting media for playback as discussed below.

In block 714, the compute device 106 determines media for playback based on the determined cast of the physical media objects 102 (e.g., which toys the user has placed together on the substrate 104). In some embodiments, in block 716, the compute device 106 may select a new media for playback based on the determined cast. Additionally or alternatively, in block 718, the compute device 106 may determine a new media index of the presently selected media at which to initiate playback based on the determined cast. Additionally or alternatively, the compute device 106 may select a new media and/or a new media index based on the movement of the physical media object(s) 102 as determined in block 712.

In block 722, the compute device 106 plays the selected media. For example, in block 724, the compute device 106 initiates playback of the media at the determined media index. After the compute device 106 has initiated playback of the selected media, the method 700 advances to block 726 of FIG. 8 in some embodiments. In block 726, the compute device 106 determines a media object output instruction based on the selected media and/or media index and transmits the determined media object output instruction to the corresponding physical media object 102 in block 728. For example, if the selected media is embodied as a fairytale including a dragon character and the media presently shows the dragon's eyes glowing, the compute device 106 may transmit a media object output instruction to a physical media object 102 representing the dragon character to cause lights representing the dragon's eyes to illuminate. In this way, aspects of the physical media object 102 may correlate with the media being played.

Subsequently, in blocks 730, 732, which may be executed contemporaneously with each other, the compute device 106 monitors for a user interaction. In block 730, the compute device 106 monitors for a user interaction with the physical media object 102. To do so, the compute device 106 may monitor for communication from the physical media object 102 indicating that the user has interacted with the corresponding physical media object. Similarly, in block 732, the compute device 106 monitors for a user interaction with the compute device 106, which may be embodied as a physical interaction or an indirect interaction as discussed above.

Regardless, in block 734, the compute device 106 determines whether any user interaction has been detected. If not, the method 700 branches ahead to block 750 of FIG. 9, described below. If, however, the compute device 106 has detected a user interaction, the method 700 advances to block 736, in which the compute device 106 selects the media and/or the media index for playback based on the detected user interaction. For example, in block 738, the compute device 106 may select the media and/or the media index for playback based on a detected user interaction with one or more physical media objects 102. Additionally or alternatively, in block 740, the compute device 106 may select the media and/or the media index for playback based on a detected user interaction with the compute device 106.

After selecting the media and/or the media index based on the detected user interaction, the method 700 advances to block 742 in which the compute device 106 initiates playback of the selected media. For example, the compute device 106 may initiate playback of the selected media at the determined media index in block 744. In this way, the media selected for playback and/or the media index at which to initiate playback may be updated or adjusted based on user interaction with the physical media objects 102 and/or the compute device 106.

In some embodiments, in block 746 of FIG. 9, the compute device 106 may again determine a media object output instruction based on the selected media and/or media index that has been updated or modified based on the detected user interaction and transmit any determined media object output instructions to the corresponding physical media object 102 in block 748.

Subsequently, in block 750, the compute device 106 determines whether to update the server 108. If not, the method 700 loops back to block 702 of FIG. 7 in which the compute device 106 continues to monitor for communication from the physical media objects 102. If, however, the compute device 106 determines to update the server 108, the method 700 advances to block 752 in which the compute device 106 determines update information to be transmitted to the server 108. In some embodiments, in block 754, the compute device 106 is determines the update information based on the received position sensor tag information. Additionally, the compute device 106 may determine the update information based on any detected user interaction with one or more physical media objects 102 in block 756.

Further, the compute device 106 may determine the update information based on any detected user interaction with compute device 106 in block 756. After the compute device 106 has determined the update information, the compute device 106 transmits the update information to the server 108 in block 760. The method 700 subsequently loops back to block 702 of FIG. 7 in which the compute device 106 continues to monitor for communication from the physical media objects 102.

Figure 10:
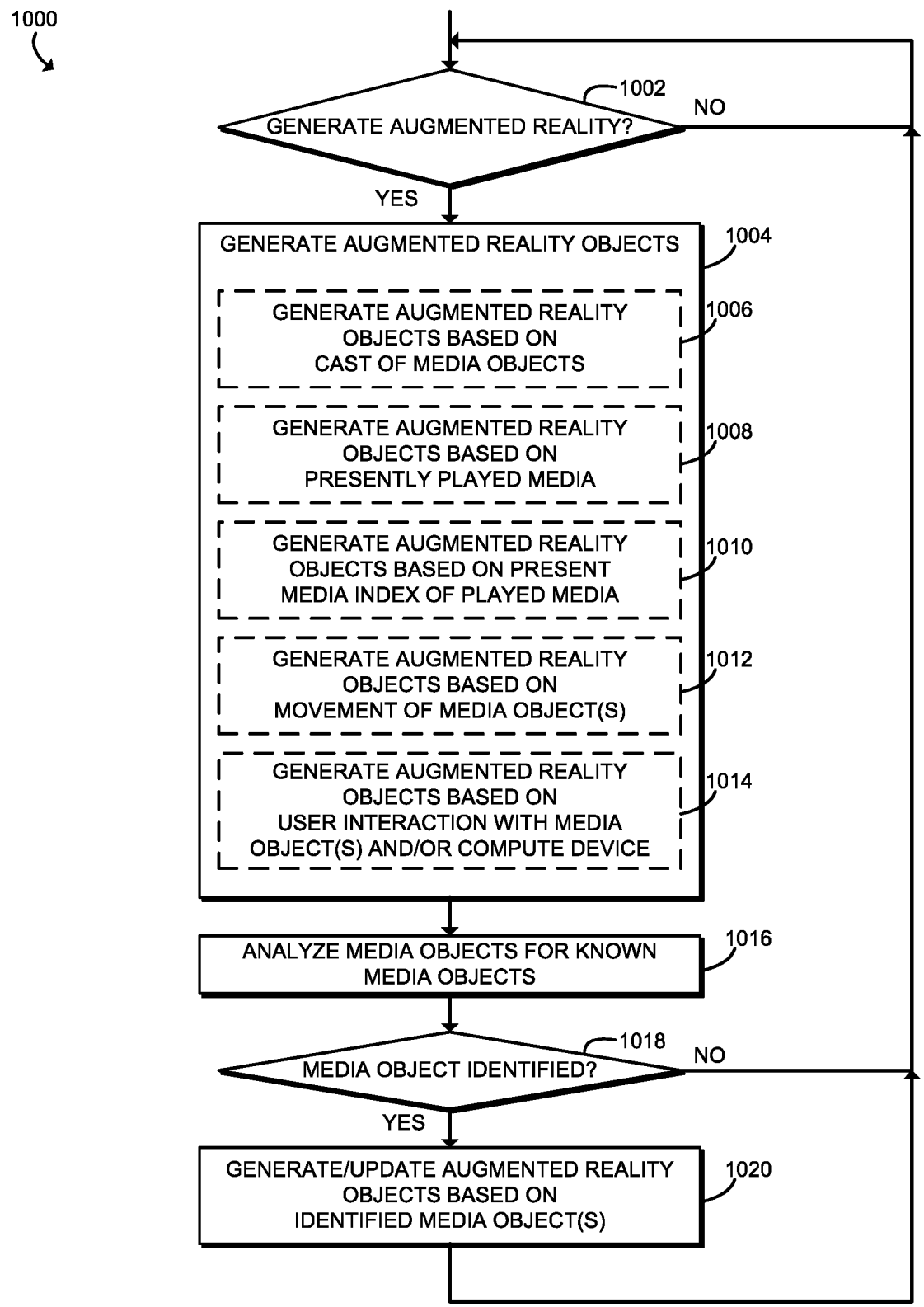
FIG. 10 is a simplified flow diagram of at least one embodiment of a method for generating augmented reality objects that may be executed by the compute device of FIGS. 1 and 4.

Referring now to FIG. 10, in some embodiments, the compute device 106 may be further configured to generate an augmented reality associated with one or more physical media objects 102. For example, in the illustrative embodiment, a user may point the camera 176 of the compute device 106 toward one or more physical media objects 102, which may be placed on the substrate 104. The user may then view additional augmented reality objects on the display 180. The augmented reality objects may be embodied as additional media objects (e.g., new characterless of a story), augment an existing physical media objects 102 (e.g., applying a costume to a physical media object), augment the substrate 104 (e.g., applying a terrain texture to the substrate 104), apply additional effects to the physical media objects 102 (e.g., display fire from a dragon's mouth), and/or otherwise augment or add to the user's experience with the physical media objects.

To generate the augmented reality, the compute device 106 may execute a method 1000 for generating augmented reality objects. The method 1000 begins with block 1002 in which the compute device 106 determines whether to generate an augmented reality. If not, the method 1000 loops back to block 1002 in which the compute device 106 continues to determine whether to generate an augmented reality. If, however, the compute device 106 determines to generate the augmented reality, the method 1000 advances to block 1004 in which the compute device 106 generates augmented reality objects. To so, in some embodiments, in block 1006, the compute device may generate the augmented reality objects based on the cast of the physical media objects 102. Additionally or alternatively, in block 1008, the compute device may generate the augmented reality objects based on a presently played media. Additionally or alternatively, in block 1010, the compute device may generate the augmented reality objects based on the present media index of the presently played media. Additionally or alternatively, in block 1012, the compute device may generate the augmented reality objects based on the movement of the physical media object(s) 102. Additionally or alternatively, in block 1014, the compute device may generate the augmented reality objects based on the user interaction with the physical media object(s) and/or the compute device.

In block 1016, the compute device 106 may also analyze the physical media objects 102 for known physical media objects 102. In block 1018, the compute device 106 determines whether at least one of the physical media objects 102 has been identified or detected. If not, the method 1000 loops back to block 1002 in which the compute device 106 continues to determine whether to generate an augmented reality. If, however, the compute device 106 has identified at least one physical media object 102, the method 1000 advances to block 1020 in which the compute device 106 generates or updates the augmented reality objects based on the identified physical media object(s) 102. For example, the compute device 106 may identify whether a physical media object 102 corresponding to a knight character is viewable on the display 180 and, if so, apply an augmented reality update to the corresponding physical media object 102.

Figure 11:
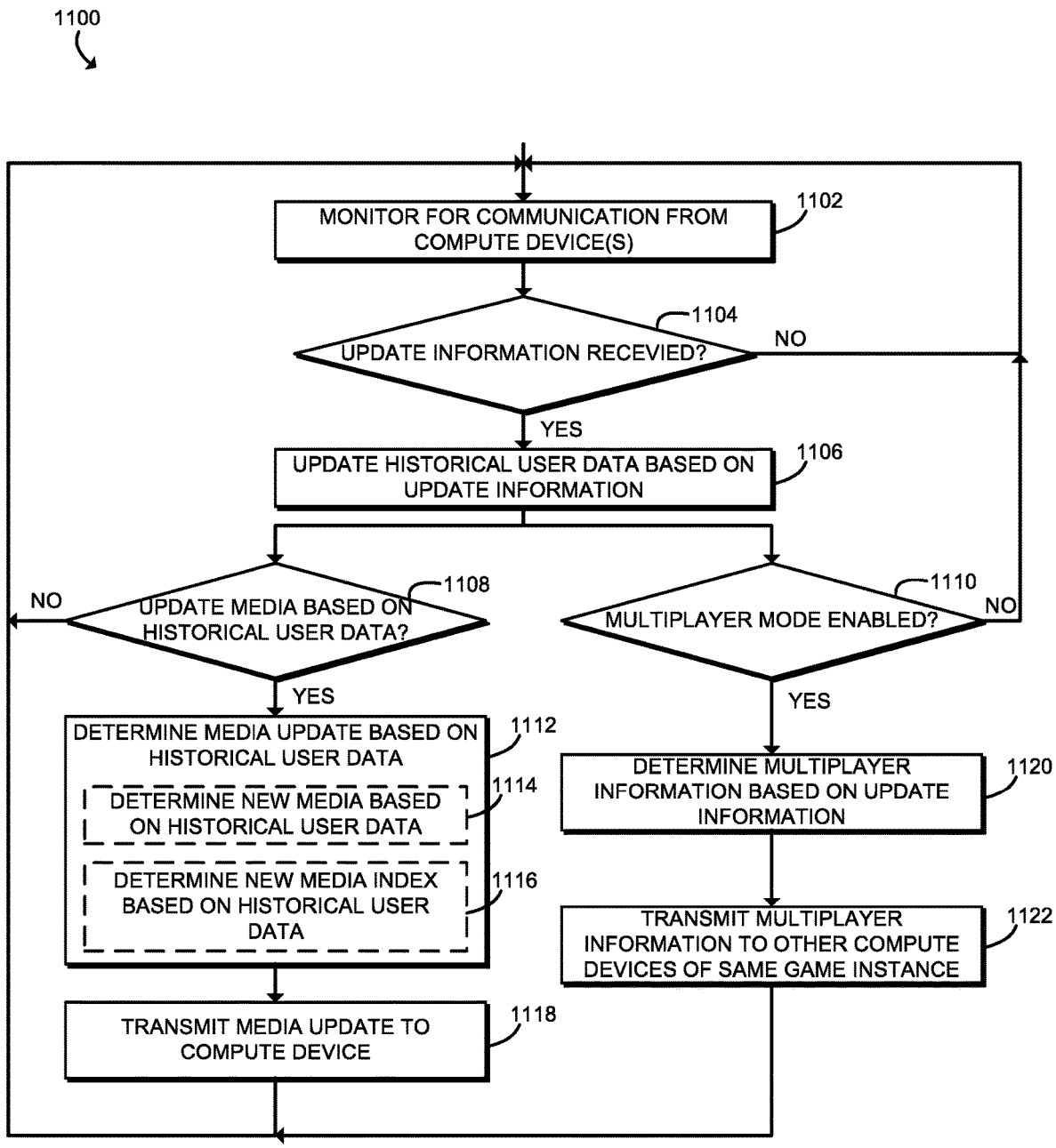
FIG. 11 is a simplified flow diagram of at least one embodiment of a method for managing user interaction data that may be executed by the server of FIGS. 1 and 5.

Referring now to FIG. 11, in use, the server 108 may execute a method 1100 for managing user interaction data. The method 1100 begins with block 1102 in which the server 108 monitors for communication from one or more compute device(s) 106. In block 1104, the server 108 determines whether the compute device 106 received any update information from a compute device 106. If not, the method 1100 loops back to block 1102 in which the server 108 continues to monitor for communication from the compute device(s) 106. If, however, the server 108 received update information, the method 1100 advances to block 1106. In block 1106, the server 108 updates historical user data based on the received update information. As discussed above, the historical user data includes, but not limited to, the previously identified physical media objects, casts, media, media indexes, and/or user interactions with physical media objects and/or the compute device 106.

After updating the historical user data, the method 1110 advances to blocks 1108, 1110, which may be executed contemporaneously with each other. In block 1108, the server 108 determines whether to update the media based on the accumulated historical user data. If the server 108 determines not to update the media based the historical user data, the method 1100 loops back to block 1102 in which the server 108 continues to monitor for communication from the compute device(s) 106. If, however, the server 108 determines to update the media based on the historical user data, the method 1100 advances to block 1112 in which the server 108 determines the media update based on the historical user data. To do so, in block 1114, the server 108 may determine a new media based on the historical user data. Additionally or alternatively, in block 1116, the server 108 may determine a new media index based on the historical user data. After the server 108 determined the media update based on the historical user data, in block 1118, the server 108 transmits the media update to the compute device 106. In this way, the server 108 may update the media content and/or media index mapping based on the user past usage of the system 100 (e.g., whether the user enjoyed a particular selected media).

Additionally, in block 1110, the server 108 determines whether a multiplayer mode is enabled. If not, the method 1100 loops back to block 1102 in which the server 108 continues to monitor for communication from the compute device(s) 106. If, however, the server 108 determines that the multiplayer mode is enabled, the method 1100 advances to block 1120 in which the server 108 determines multiplayer information based on the received update information and transmits the multiplayer information to other compute devices 106 (e.g., the compute devices 106 that are playing the same game) in block 1122. In this way, the server 108 may transfer user's interaction with the physical media objects 102 and/or the local compute device 106 between compute devices 106 playing the same game or media content.

EXAMPLES

Illustrative examples of the technologies disclosed herein are provided below. An embodiment of the technologies may include any one or more, and any combination of, the examples described below.

Example 1 includes a compute device for structured media playback, the compute device comprising a media database comprises one or more media for playback; a display; an object position tracker to (i) receive a tag information of a position sensor tag sensed by a physical media object and (ii) determine a cast of physical media objects based on at least the received tag information; and a media controller to select a media for playback from a media database based on the determined cast of physical media objects and play the selected media on a display of the compute device.

Example 2 includes the subject matter of Example 1, and wherein to receive the tag information of the position sensor tag comprises to receive a tag identifier of the sensed position sensor tag, wherein the tag identifier uniquely identifies the sensed position sensor tag from other position sensor tags in a vicinity of the sensed position sensor tag.

Example 3 includes the subject matter of any of Examples 1 and 2, and wherein to receive the tag information of the position sensor tag comprises to receive metadata related to the sensed position sensor tag, wherein the metadata defines context information related to the sensed position sensor tag.

Example 4 includes the subject matter of any of Examples 1-3, and wherein to determine the cast of the physical media objects comprises to determine a relative proximity of the physical media objects to each other based at least in part on the tag information.

Example 5 includes the subject matter of any of Examples 1-4, and wherein to determine the cast of the physical media objects comprises to ignore one or more physical media objects that are not in proximity with the physical media object from which the tag information was received.

Example 6 includes the subject matter of any of Examples 1-5, and wherein to determine the cast of the physical media objects comprises to determine a movement of the physical media object based on the tag information.

Example 7 includes the subject matter of any of Examples 1-6, and wherein to select the media for playback comprises to select a new media for playback based on the determined movement of the physical media object.

Example 8 includes the subject matter of any of Examples 1-7, and wherein to select the media for playback comprises to select a new media for playback based on the determined cast of physical media objects.

Example 9 includes the subject matter of any of Examples 1-8, and wherein to select the media for playback comprises to determine an index of the selected media at which to initiate playback based on the determined cast of physical media objects.

Example 10 includes the subject matter of any of Examples 1-9, and wherein to play the selected media comprises to play the selected media at the determined media index.

Example 11 includes the subject matter of any of Examples 1-10, and further including a user interaction manager to determine a media object output instruction based on a media index of the selected media, wherein the media index defines a present temporal location within the selected media and the media object output instruction is indicative of an output to be produced by the physical media object; and a data communicator to transmit a media object output instruction to the physical media object.

Example 12 includes the subject matter of any of Examples 1-11, and further including a user interaction manager to monitor a user interaction, wherein to select the media for playback comprises to select, by the compute device, the media for playback based at least in part on the user interaction.

Example 13 includes the subject matter of any of Examples 1-12, and wherein to monitor the user interaction comprises to monitor the user interaction with the compute device.

Example 14 includes the subject matter of any of Examples 1-13, and wherein to select the media for playback comprises to select the media for playback based on the user interaction with the compute device.

Example 15 includes the subject matter of any of Examples 1-14, and wherein to select the media for playback comprises to select the media for playback based on the user interaction with physical the media object.

Example 16 includes the subject matter of any of Examples 1-15, and wherein to monitor the user interaction comprises to receive, from the physical media object, a user interaction notification indicative of a user interaction with the physical media object.

Example 17 includes the subject matter of any of Examples 1-16, and wherein to monitor the user interaction comprises to monitor for a gesture performed by the user.

Example 18 includes the subject matter of any of Examples 1-17, and wherein to monitor the user interaction comprises to monitor for a facial expression of the user.

Example 19 includes the subject matter of any of Examples 1-18, and wherein to monitor the user interaction comprises to monitor voice data of the user indicative of the user's voice.

Example 20 includes the subject matter of any of Examples 1-19, and wherein to select the media for playback comprises to select a new media based on the user interaction.

Example 21 includes the subject matter of any of Examples 1-20, and wherein to select the media for playback comprises to determine an index of the selected media at which to initiate playback based on the user interaction.

Example 22 includes the subject matter of any of Examples 1-21, and wherein to play the selected media comprises to play the selected media at the determined media index.

Example 23 includes a method of structured media playback, the method comprising receiving, by a compute device and from at least one physical media object, tag information of a position sensor tag sensed by the physical media object; determining, by the compute device, a cast of the physical media objects based on at least the received tag information; selecting, by the compute device, a media for playback on the compute device based on the determined cast of physical media objects; and playing, by the compute device, the selected media.

Example 24 includes the subject matter of Example 23, and wherein receiving the tag information of the position sensor tag comprises receiving a tag identifier of the sensed position sensor tag, wherein the tag identifier uniquely identifies the sensed position sensor tag from other tags in a vicinity of the sensed position sensor tag.

Example 25 includes the subject matter of any of Examples 23 and 24, and wherein receiving the tag information of the position sensor tag comprises receiving metadata related to the sensed position sensor tag, wherein the metadata defines context information related to the sensed position sensor tag.

Example 26 includes the subject matter of any of Examples 23-25, and wherein determining the cast of the physical media objects comprises determining a relative proximity of the physical media objects to each other based at least in part on the tag information.

Example 27 includes the subject matter of any of Examples 23-26, and wherein determining the cast of the physical media objects comprises ignoring one or more physical media objects that are not in proximity with the physical media object from which the tag information was received.

Example 28 includes the subject matter of any of Examples 23-27, and wherein determining the cast of the physical media objects comprises determining a movement of the physical media object based on the tag information.

Example 29 includes the subject matter of any of Examples 23-28, and wherein selecting the media for playback comprises selecting a new media for playback based on the determined movement of the physical media object.

Example 30 includes the subject matter of any of Examples 23-29, and wherein selecting the media for playback comprises selecting a new media for playback based on the determined cast of physical media objects.

Example 31 includes the subject matter of any of Examples 23-30, and wherein selecting the media for playback comprises determining an index of the selected media at which to initiate playback based on the determined cast of physical media objects.

Example 32 includes the subject matter of any of Examples 23-31, and wherein playing the selected media comprises playing the selected media at the determined media index.

Example 33 includes the subject matter of any of Examples 23-32, and further including determining a media object output instruction based on a media index of the selected media, wherein the media index defines a present temporal location within the selected media and the media object output instruction is indicative of an output to be produced by the physical media object; and transmitting the media object output instruction to the physical media object.

Example 34 includes the subject matter of any of Examples 23-33, and further including monitoring a user interaction; and selecting, by the compute device, the media for playback based at least in part on the user interaction.

Example 35 includes the subject matter of any of Examples 23-34, and wherein monitoring the user interaction comprises monitoring, by the compute device, the user interaction with the compute device.

Example 36 includes the subject matter of any of Examples 23-35, and wherein selecting the media for playback comprises selecting the media for playback based on the user interaction with the compute device.

Example 37 includes the subject matter of any of Examples 23-36, and wherein selecting the media for playback comprises selecting the media for playback based on the user interaction with physical the media object.

Example 38 includes the subject matter of any of Examples 23-37, and wherein monitoring the user interaction comprises receiving, by the compute device and from the physical media object, a user interaction notification indicative of a user interaction with the physical media object.

Example 39 includes the subject matter of any of Examples 23-38, and wherein monitoring the user interaction comprises monitoring for a gesture performed by the user.

Example 40 includes the subject matter of any of Examples 23-39, and wherein monitoring the user interaction comprises monitoring for a facial expression of the user.

Example 41 includes the subject matter of any of Examples 23-40, and wherein monitoring the user interaction comprises monitoring voice data of the user indicative of the user's voice.

Example 42 includes the subject matter of any of Examples 23-41, and wherein selecting the media for playback comprises selecting a new media based on the user interaction.

Example 43 includes the subject matter of any of Examples 23-42, and wherein selecting the media for playback comprises determining an index of the selected media at which to initiate playback based on the user interaction.

Example 44 includes the subject matter of any of Examples 23-43, and wherein playing the selected media comprises playing the selected media at the determined media index.

Example 45 includes a physical media object for structured media playback, the physical media object comprising a position detector to sense, a tag identifier of one or more position sensor tags within a local vicinity of the physical media object; a data communicator to (i) transmit the sensed tag identifier to a compute device and (ii) receive an output instruction from the compute device; and an action manager to generate an output action based on the received output instruction.

Example 46 includes the subject matter of Example 45, and wherein to sense the tag information of one or more position sensor tags comprises to sense the tag information of a near field communications (NFC) tag within a local vicinity of the physical media object.

Example 47 includes the subject matter of any of Examples 45 and 46, and wherein to sense the tag information of one or more position sensor tags comprises to sense the tag information of a radio frequency identification (RFID) tag within a local vicinity of the physical media object.

Example 48 includes the subject matter of any of Examples 45-47, and wherein to transmit the tag information comprises to transmit a tag identifier of the sensed position sensor tag to the compute device, wherein the tag identifier uniquely identifies the sensed position sensor tag from other position sensor tags in the local vicinity of the sensed position sensor tag.

Example 49 includes the subject matter of any of Examples 45-48, and wherein to transmit the sensed tag information comprises to transmit metadata of the sensed position sensor tag to the compute device, wherein the metadata defines context information related to the sensed position sensor tag.

Example 50 includes the subject matter of any of Examples 45-49, and further including a user interaction manager to detect a user interaction with the physical media object.

Example 51 includes the subject matter of any of Examples 45-50, and wherein to detect the user interaction comprises to detect the user interaction based on a physical interaction of the user with the physical media object.

Example 52 includes the subject matter of any of Examples 45-51, and wherein to detect the user interaction comprises to detect the user interaction based on a gesture performed by the user.

Example 53 includes the subject matter of any of Examples 45-52, and wherein to detect the user interaction comprises to detect the user interaction based on a facial expression of the user.

Example 54 includes the subject matter of any of Examples 45-53, and wherein to detect the user interaction comprises to detect the user interaction based on captured voice data of the user.

Example 55 includes the subject matter of any of Examples 45-54, and wherein to generate the output action comprises to generate the output action based on the detected user interaction.

Example 56 includes the subject matter of any of Examples 45-55, and wherein to generate the output action comprises to generate the output action based on the tag information.

Example 57 includes a method for facilitating structured media playback, the method comprising sensing, by a physical media object, a tag information of one or more position sensor tags within a local vicinity of the physical media object; transmitting, by the physical media object, the sensed tag information to a compute device; receiving, by the physical media object, an output instruction from the compute device; and generating, by the physical media object, an output action based on the received output instruction.

Example 58 includes the subject matter of Example 57, and wherein sensing the tag information of one or more position sensor tags comprises sensing the tag information of a near field communications (NFC) tag within a local vicinity of the physical media object.

Example 59 includes the subject matter of any of Examples 57 and 58, and wherein sensing the tag information of one or more position sensor tags comprises sensing the tag information of a radio frequency identification (RFID) tag within a local vicinity of the physical media object.

Example 60 includes the subject matter of any of Examples 57-59, and wherein transmitting the sensed tag information comprises transmitting a tag identifier of the sensed position sensor tag to the compute device, wherein the tag identifier uniquely identifies the sensed position sensor tag from other tags in the local vicinity of the sensed position sensor tag.

Example 61 includes the subject matter of any of Examples 57-60, and wherein transmitting the sensed tag information comprises transmitting metadata of the sensed position sensor tag to the compute device, wherein the metadata defines context information related to the sensed position sensor tag.

Example 62 includes the subject matter of any of Examples 57-61, and further including detecting a user interaction with the physical media object.

Example 63 includes the subject matter of any of Examples 57-62, and wherein detecting the user interaction comprises detecting the user interaction based on a physical interaction of the user with the physical media object.

Example 64 includes the subject matter of any of Examples 57-63, and wherein detecting the user interaction comprises detecting the user interaction based on a gesture performed by the user.

Example 65 includes the subject matter of any of Examples 57-64, and wherein detecting the user interaction comprises detecting the user interaction based on a facial expression of the user.

Example 66 includes the subject matter of any of Examples 57-65, and wherein detecting the user interaction comprises detecting the user interaction based on captured voice data of the user.

Example 67 includes the subject matter of any of Examples 57-66, and wherein generating the output action comprises generating the output action based on the detected user interaction.

Example 68 includes the subject matter of any of Examples 57-67, and wherein generating the output action comprises generating the output action based on the tag information.

Example 69 includes a system for structured media playback, the system comprising a substrate having a matrix of position sensor tags embedded therein; a physical media object positionable on the substrate, the physical media object to sense tag information of at least one position sensor tag of the matrix of position sensor tags when positioned on the substrate and transmit the sensed tag information; and a compute device to receive the tag information from the physical media object, determine a cast of physical media objects based on the received tag information, select a media for playback based on the determined cast of physical media objects, and initiate playback of the selected media.

Example 70 includes the subject matter of Example 69, and wherein the tag information comprises a tag identifier that uniquely identifies the sensed position sensor tag from other position sensor tags in a vicinity of the sensed position sensor tag.

Example 71 includes the subject matter of any of Examples 69 and 70, and wherein the tag information comprises metadata that defines context information related to the sensed position sensor tag.

Example 72 includes the subject matter of any of Examples 69-71, and wherein to determine the cast of the physical media objects comprises to determine a relative proximity of the physical media objects to each other based at least in part on the tag information.

Example 73 includes the subject matter of any of Examples 69-72, and wherein to determine the cast of the physical media objects comprises to ignore one or more physical media objects not in proximity with the physical media object.

Example 74 includes the subject matter of any of Examples 69-73, and wherein to determine the cast of the physical media objects comprises to determine a movement of the physical media object based on the tag information.

Example 75 includes the subject matter of any of Examples 69-74, and wherein to select the media for playback comprises to select a new media based on the determined movement of the physical media object.

Example 76 includes the subject matter of any of Examples 69-75, and wherein to select the media for playback comprises to select a new media for playback based on the determined cast of physical media objects.

Example 77 includes the subject matter of any of Examples 69-76, and wherein to select the media for playback comprises to determine an index of the selected media at which to initiate playback based on the determined cast of physical media objects.

Example 78 includes the subject matter of any of Examples 69-77, and wherein to play the selected media comprises to play the selected media at the determined media index.

Example 79 includes a method for structured media playback, the method comprising sensing, by a physical media object, tag information of one or more position sensor tags embedded in a substrate on which the physical media object is placed; transmitting, by the physical media object, the sensed tag information to a compute device; determining, by the compute device, a cast of physical media objects based on at least the received tag information; selecting, by the compute device, a media for playback on the compute device based on the determined cast of physical media objects; and playing, by the compute device, the selected media.

Example 80 includes the subject matter of Example 79, and wherein sensing the tag information of the position sensor tag comprises sensing a tag identifier of the position sensor tag embedded in a substrate on which the physical media object is placed, wherein the tag identifier uniquely identifies the sensed position sensor tag from other position sensor tags in a vicinity of the sensed position sensor tag.

Example 81 includes the subject matter of any of Examples 79 and 80, and wherein sensing the tag information of the position sensor tag comprises sensing metadata related to the position sensor tag embedded in a substrate on which the physical media object is placed, wherein the metadata defines context information related to the sensed position sensor tag.

Example 82 includes the subject matter of any of Examples 79-81, and wherein determining the cast of the physical media objects comprises determining a relative proximity of the physical media objects to each other based at least in part on the tag information.

Example 83 includes the subject matter of any of Examples 79-82, and wherein determining the cast of the physical media objects comprises ignoring one or more physical media objects not in proximity with the physical media object.

Example 84 includes the subject matter of any of Examples 79-83, and wherein determining the cast of the physical media objects comprises determining a movement of the physical media object based on the tag information.

Example 85 includes the subject matter of any of Examples 79-84, and wherein selecting the media for playback comprises selecting a new media based on the determined movement of the physical media object.

Example 86 includes the subject matter of any of Examples 79-85, and wherein selecting the media for playback comprises selecting a new media for playback based on the determined cast of physical media objects.

Example 87 includes the subject matter of any of Examples 79-86, and wherein selecting the media for playback comprises determining an index of the selected media at which to initiate playback based on the determined cast of physical media objects.

Example 88 includes the subject matter of any of Examples 79-87, and wherein playing the selected media comprises playing the selected media at the determined media index.

Example 89 includes one or more machine-readable storage media comprising a plurality of instructions stored thereon that, when executed, causes a device to perform the method of any of Examples 23-44, 57-68, and 79-88.

Example 90 includes a compute device for structured media playback, the compute device comprising means for receiving, from at least one physical media object, tag information of a position sensor tag sensed by the physical media object; means for determining a cast of the physical media objects based on at least the received tag information; means for selecting a media for playback on the compute device based on the determined cast of physical media objects; and means for playing the selected media.

Example 91 includes the subject matter of Example 90, and wherein the means for receiving the tag information of the position sensor tag comprises means for receiving a tag identifier of the sensed position sensor tag, wherein the tag identifier uniquely identifies the sensed position sensor tag from other tags in a vicinity of the sensed position sensor tag.

Example 92 includes the subject matter of any of Examples 90 and 91, and wherein the means for receiving the tag information of the position sensor tag comprises means for receiving metadata related to the sensed position sensor tag, wherein the metadata defines context information related to the sensed position sensor tag.

Example 93 includes the subject matter of any of Examples 90-92, and wherein the means for determining the cast of the physical media objects comprises means for determining a relative proximity of the physical media objects to each other based at least in part on the tag information.

Example 94 includes the subject matter of any of Examples 90-93, and wherein the means for determining the cast of the physical media objects comprises means for ignoring one or more physical media objects that are not in proximity with the physical media object from which the tag information was received.

Example 95 includes the subject matter of any of Examples 90-94, and wherein the means for determining the cast of the physical media objects comprises means for determining a movement of the physical media object based on the tag information.

Example 96 includes the subject matter of any of Examples 90-95, and wherein the means for selecting the media for playback comprises means for selecting a new media for playback based on the determined movement of the physical media object.

Example 97 includes the subject matter of any of Examples 90-96, and wherein the means for selecting the media for playback comprises means for selecting a new media for playback based on the determined cast of physical media objects.

Example 98 includes the subject matter of any of Examples 90-97, and wherein the means for selecting the media for playback comprises means for determining an index of the selected media at which to initiate playback based on the determined cast of physical media objects.

Example 99 includes the subject matter of any of Examples 90-98, and wherein the means for playing the selected media comprises means for playing the selected media at the determined media index.

Example 100 includes the subject matter of any of Examples 90-99, and further including means for determining a media object output instruction based on a media index of the selected media, wherein the media index defines a present temporal location within the selected media and the media object output instruction is indicative of an output to be produced by the physical media object; and means for transmitting the media object output instruction to the physical media object.

Example 101 includes the subject matter of any of Examples 90-100, and further including means for monitoring a user interaction; and means for selecting the media for playback based at least in part on the user interaction.

Example 102 includes the subject matter of any of Examples 90-101, and wherein the means for monitoring the user interaction comprises means for monitoring the user interaction with the compute device.

Example 103 includes the subject matter of any of Examples 90-102, and wherein the means for selecting the media for playback comprises means for selecting the media for playback based on the user interaction with the compute device.

Example 104 includes the subject matter of any of Examples 90-103, and wherein the means for selecting the media for playback comprises means for selecting the media for playback based on the user interaction with physical the media object.

Example 105 includes the subject matter of any of Examples 90-104, and wherein the means for monitoring the user interaction comprises means for receiving, from the physical media object, a user interaction notification indicative of a user interaction with the physical media object.

Example 106 includes the subject matter of any of Examples 90-105, and wherein the means for monitoring the user interaction comprises means for monitoring for a gesture performed by the user.

Example 107 includes the subject matter of any of Examples 90-106, and wherein the means for monitoring the user interaction comprises means for monitoring for a facial expression of the user.

Example 108 includes the subject matter of any of Examples 90-107, and wherein the means for monitoring the user interaction comprises means for monitoring voice data of the user indicative of the user's voice.

Example 109 includes the subject matter of any of Examples 90-108, and wherein the means for selecting the media for playback comprises means for selecting a new media based on the user interaction.

Example 110 includes the subject matter of any of Examples 90-109, and wherein the means for selecting the media for playback comprises means for determining an index of the selected media at which to initiate playback based on the user interaction.

Example 111 includes the subject matter of any of Examples 90-110, and wherein the means for playing the selected media comprises means for playing the selected media at the determined media index.

Example 112 includes a physical media object for structured media playback, the physical media object comprising means for sensing a tag information of one or more position sensor tags within a local vicinity of the physical media object; means for transmitting the sensed tag information to a compute device; means for receiving an output instruction from the compute device; and means for generating an output action based on the received output instruction.

Example 113 includes the subject matter of Example 112, and wherein the means for sensing the tag information of one or more position sensor tags comprises means for sensing the tag information of a near field communications (NFC) tag within a local vicinity of the physical media object.

Example 114 includes the subject matter of any of Examples 112 and 113, and wherein the means for sensing the tag information of one or more position sensor tags comprises means for sensing the tag information of a radio frequency identification (RFID) tag within a local vicinity of the physical media object.

Example 115 includes the subject matter of any of Examples 112-114, and wherein the means for transmitting the sensed tag information comprises means for transmitting a tag identifier of the sensed position sensor tag to the compute device, wherein the tag identifier uniquely identifies the sensed position sensor tag from other tags in the local vicinity of the sensed position sensor tag.

Example 116 includes the subject matter of any of Examples 112-115, and wherein the means for transmitting the sensed tag information comprises means for transmitting metadata of the sensed position sensor tag to the compute device, wherein the metadata defines context information related to the sensed position sensor tag.

Example 117 includes the subject matter of any of Examples 112-116, and further including means for detecting a user interaction with the physical media object.

Example 118 includes the subject matter of any of Examples 112-117, and wherein the means for detecting the user interaction comprises means for detecting the user interaction based on a physical interaction of the user with the physical media object.

Example 119 includes the subject matter of any of Examples 112-118, and wherein the means for detecting the user interaction comprises means for detecting the user interaction based on a gesture performed by the user.

Example 120 includes the subject matter of any of Examples 112-119, and wherein the means for detecting the user interaction comprises means for detecting the user interaction based on a facial expression of the user.

Example 121 includes the subject matter of any of Examples 112-120, and wherein the means for detecting the user interaction comprises means for detecting the user interaction based on captured voice data of the user.

Example 122 includes the subject matter of any of Examples 112-121, and wherein the means for generating the output action comprises means for generating the output action based on the detected user interaction.

Example 123 includes the subject matter of any of Examples 112-122, and wherein the means for generating the output action comprises means for generating the output action based on the tag information.

Example 124 includes a system for structured media playback, the system comprising means for sensing tag information of one or more position sensor tags embedded in a substrate on which the physical media object is placed; means for transmitting the sensed tag information to a compute device; means for determining a cast of physical media objects based on at least the received tag information; means for selecting a media for playback on the compute device based on the determined cast of physical media objects; and means for playing the selected media.

Example 125 includes the subject matter of Example 124, and wherein the means for sensing the tag information of the position sensor tag comprises means for sensing a tag identifier of the position sensor tag embedded in a substrate on which the physical media object is placed, wherein the tag identifier uniquely identifies the sensed position sensor tag from other position sensor tags in a vicinity of the sensed position sensor tag.

Example 126 includes the subject matter of any of Examples 124 and 125, and wherein the means for sensing the tag information of the position sensor tag comprises means for sensing metadata related to the position sensor tag embedded in a substrate on which the physical media object is placed, wherein the metadata defines context information related to the sensed position sensor tag.

Example 127 includes the subject matter of any of Examples 124-126, and wherein the means for determining the cast of the physical media objects comprises means for determining a relative proximity of the physical media objects to each other based at least in part on the tag information.

Example 128 includes the subject matter of any of Examples 124-127, and wherein the means for determining the cast of the physical media objects comprises means for ignoring one or more physical media objects not in proximity with the physical media object.

Example 129 includes the subject matter of any of Examples 124-128, and wherein the means for determining the cast of the physical media objects comprises means for determining a movement of the physical media object based on the tag information.

Example 130 includes the subject matter of any of Examples 124-129, and wherein the means for selecting the media for playback comprises means for selecting a new media based on the determined movement of the physical media object.

Example 131 includes the subject matter of any of Examples 124-130, and wherein the means for selecting the media for playback comprises means for selecting a new media for playback based on the determined cast of physical media objects.

Example 132 includes the subject matter of any of Examples 124-131, and wherein the means for selecting the media for playback comprises means for determining an index of the selected media at which to initiate playback based on the determined cast of physical media objects.

Example 133 includes the subject matter of any of Examples 124-132, and wherein the means for playing the selected media comprises means for playing the selected media at the determined media index.

The invention claimed is:

1. A compute device for structured media playback, the compute device comprising:
    a media database including one or more media for playback;
    a display;
    an object position tracker to (i) receive tag information of a first position sensor tag sensed by a first physical media object and a second position sensor tag sensed by a second physical media object and (ii) determine a cast of at least the first and second physical media objects based on at least the received tag information; and
    a media controller to (i) select a media for playback from the media database based on the determined cast of the at least the first and second physical media objects and (ii) play the selected media on the display of the compute device.

2. The compute device of claim 1, wherein to receive the tag information of the first position sensor tag, the object position tracker is to receive a tag identifier of the first position sensor tag, the tag identifier to uniquely identify the first position sensor tag from other position sensor tags in a vicinity of the first position sensor tag.

3. The compute device of claim 1, wherein to determine the cast of the at least the first and second physical media objects, the object position tracker is to determine a relative proximity of the at least the first and second physical media objects to each other based at least in part on the tag information.

4. The compute device of claim 1, wherein the media controller is to determine an index of the selected media at which to initiate playback based on the determined cast of the at least the first and second physical media objects.

5. The compute device of claim 4, wherein the media controller is to play the selected media at the determined media index.

6. The compute device of claim 1, further including:
    a user interaction manager to determine a media object output instruction based on a media index of the selected media, wherein the media index defines a present temporal location within the selected media and the media object output instruction is indicative of an output to be produced by the first physical media object; and
    a data communicator to transmit the media object output instruction to the first physical media object.

7. The compute device of claim 1, further including a user interaction manager to monitor a user interaction with the compute device or the first physical media object, wherein the media controller is to select the media for playback based at least in part on the user interaction.

8. One or more non-transitory, machine-readable storage media comprising a plurality of instructions stored thereon that, when executed, causes a compute device to at least:
    receive tag information of a first position sensor tag sensed by a first physical media object and a second position sensor tag sensed by a second physical media object;
    determine a cast of at least the first and second physical media objects based on at least the received tag information;
    select a media for playback on the compute device based on the determined cast of the at least the first and second physical media objects; and
    play the selected media.

9. The one or more non-transitory, machine-readable storage media of claim 8, wherein to receive the tag information of the first position sensor tag, the instructions, when executed, cause the compute device to receive a tag identifier of the first position sensor tag, the tag identifier to uniquely identify the first position sensor tag from other tags in a vicinity of the first position sensor tag.

10. The one or more non-transitory, machine-readable storage media of claim 8, wherein to determine the cast of the at least the first and second physical media objects, the instructions, when executed, cause the compute device to determine a relative proximity of the at least the first and second physical media objects to each other based at least in part on the tag information.

11. The one or more non-transitory, machine-readable storage media of claim 8, wherein the instructions, when executed, cause the compute device to determine an index of the selected media at which to initiate playback based on the determined cast of the at least the first and second physical media objects.

12. The one or more non-transitory, machine-readable storage media of claim 11, wherein the instructions, when executed, cause the compute device to play the selected media at the determined media index.

13. The one or more non-transitory, machine-readable storage media of claim 8, wherein the instructions, when executed, further cause the compute device to:
    determine a media object output instruction based on a media index of the selected media, wherein the media index defines a present temporal location within the selected media and the media object output instruction is indicative of an output to be produced by the first physical media object; and
    transmit the media object output instruction to the first physical media object.

14. The one or more non-transitory, machine-readable storage media of claim 8, wherein the instructions, when executed, further cause the compute device to:
    monitor a user interaction with the compute device or the first physical media object; and
    select the media for playback based at least in part on the user interaction.

15. A method comprising:
- receiving, at a compute device, tag information of a first position sensor tag sensed by a first physical media object and a second position sensor tag sensed by a second physical media object;
- determining, by executing an instruction with at least one processor of the compute device, a cast of at least the first and second physical media objects based on at least the received tag information;
- selecting, by executing an instruction with the at least one processor, a media for playback on the compute device based on the determined cast of the at least the first and second physical media objects; and
- playing the selected media on the compute device.

16. The method of claim 15, wherein the receiving of the tag information includes receiving a tag identifier of the first position sensor tag, the tag identifier to uniquely identify the first position sensor tag from other tags in a vicinity of the first position sensor tag.

17. The method of claim 15, wherein the determining of the cast of the at least the first and second physical media objects includes determining a relative proximity of the at least the first and second physical media objects to each other based at least in part on the tag information.

18. The method of claim 15, further including determining an index of the selected media at which to initiate playback based on the determined cast of the at least the first and second physical media objects.

19. The method of claim 18, wherein the playing of the selected media includes playing the selected media at the determined media index.

20. The method of claim 15, further including:
- determining a media object output instruction based on a media index of the selected media, wherein the media index defines a present temporal location within the selected media and the media object output instruction is indicative of an output to be produced by the first physical media object; and
- transmitting the media object output instruction to the first physical media object.

21. The method of claim 15, further including:
- monitoring a user interaction with the compute device or the first physical media object; and
- selecting the media for playback based at least in part on the user interaction.

* * * * *